(12) United States Patent  
Coutinho et al.

(10) Patent No.: US 11,860,851 B2  
(45) Date of Patent: Jan. 2, 2024

(54) SYSTEMS AND METHODS TO GUARANTEE DATA INTEGRITY WHEN BUILDING DATA ANALYTICS IN A NETWORK OF MOVING THINGS

(71) Applicant: Veniam, Inc., Mountain View, CA (US)

(72) Inventors: Nuno Alexandre Tavares Coutinho, Oporto (PT); Daniel Cardoso de Moura, Vila Nova de Gaia (PT); Eduardo da Cruz Antunes Moreira da Mota, Vila Nova de Gaia (PT)

(73) Assignee: VENIAM, INC., Mountain View, CA (US)

( * ) Notice: Subject to any disclaimer, the term of this patent is extended or adjusted under 35 U.S.C. 154(b) by 393 days.

(21) Appl. No.: 15/335,884

(22) Filed: Oct. 27, 2016

(65) Prior Publication Data

US 2017/0206238 A1   Jul. 20, 2017

Related U.S. Application Data

(60) Provisional application No. 62/278,764, filed on Jan. 14, 2016.

(51) Int. Cl.
| | |
|---|---|
| *G06F 16/23* | (2019.01) |
| *H04W 4/021* | (2018.01) |
| *H04W 4/70* | (2018.01) |
| *H04L 67/1097* | (2022.01) |
| *G06F 16/215* | (2019.01) |
| *H04L 9/40* | (2022.01) |
| *H04W 84/00* | (2009.01) |

(52) U.S. Cl.  
CPC ........ *G06F 16/2365* (2019.01); *G06F 16/215* (2019.01); *H04L 63/123* (2013.01); *H04L 67/1097* (2013.01); *H04W 4/021* (2013.01); *H04W 4/70* (2018.02); *H04W 84/005* (2013.01)

(58) Field of Classification Search  
CPC .... G06F 16/2365; G06F 16/215; H04W 4/70; H04W 4/021; H04W 84/005; H04L 63/123; H04L 67/1097  
See application file for complete search history.

(56) References Cited

U.S. PATENT DOCUMENTS

| | | | | |
|---|---|---|---|---|
| 9,800,716 | B2 * | 10/2017 | Abramson | H04W 4/48 |
| 2007/0234108 | A1 * | 10/2007 | Cox | G06F 11/2079 |
| | | | | 714/6.12 |
| 2008/0006687 | A1 * | 1/2008 | Mueller | G06Q 20/0425 |
| | | | | 235/379 |

(Continued)

FOREIGN PATENT DOCUMENTS

CN   201510417386.0   *   7/2015   ......... G06F 16/2365

*Primary Examiner* — Vaishali Shah  
(74) *Attorney, Agent, or Firm* — McAndrews, Held & Malloy, Ltd.

(57) ABSTRACT

Systems and methods for guaranteeing the integrity of created within or transferred using a network of moving things. Different types of data from different data sources may be monitored, and various approaches to validating such data may be employed using expected data characteristics, alternate data sources, and historical information to help maximize the likelihood that data destined for a particular destination is available when needed, and is found to be valid and reliable.

30 Claims, 13 Drawing Sheets

(56) References Cited

U.S. PATENT DOCUMENTS

| | | | |
|---|---|---|---|
| 2012/0144451 A1* | 6/2012 | Gutt | H04W 12/122 |
| | | | 726/26 |
| 2014/0317005 A1* | 10/2014 | Balwani | G06Q 10/0832 |
| | | | 705/317 |
| 2015/0369924 A1* | 12/2015 | Hedgecock | G01S 19/51 |
| | | | 342/357.34 |
| 2016/0127539 A1* | 5/2016 | Sharma | H04M 3/42306 |
| | | | 379/112.09 |
| 2016/0219024 A1* | 7/2016 | Verzun | H04L 63/102 |
| 2016/0295001 A1* | 10/2016 | Yun | H04M 1/72527 |
| 2017/0118187 A1* | 4/2017 | El Khoury | H04L 63/1408 |
| 2018/0107195 A1* | 4/2018 | Noetzelmann | G05B 19/418 |
| 2019/0090174 A1 | 3/2019 | Rocci et al. | |

* cited by examiner

SYSTEMS AND METHODS TO GUARANTEE DATA INTEGRITY WHEN BUILDING DATA ANALYTICS IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/278,764, filed on Jan. 14, 2016, and titled "Systems and Methods to Guarantee Data Integrity When Building Data Analytics in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/222,192, titled "Communication Network of Moving Things," filed on Sep. 22, 2015; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
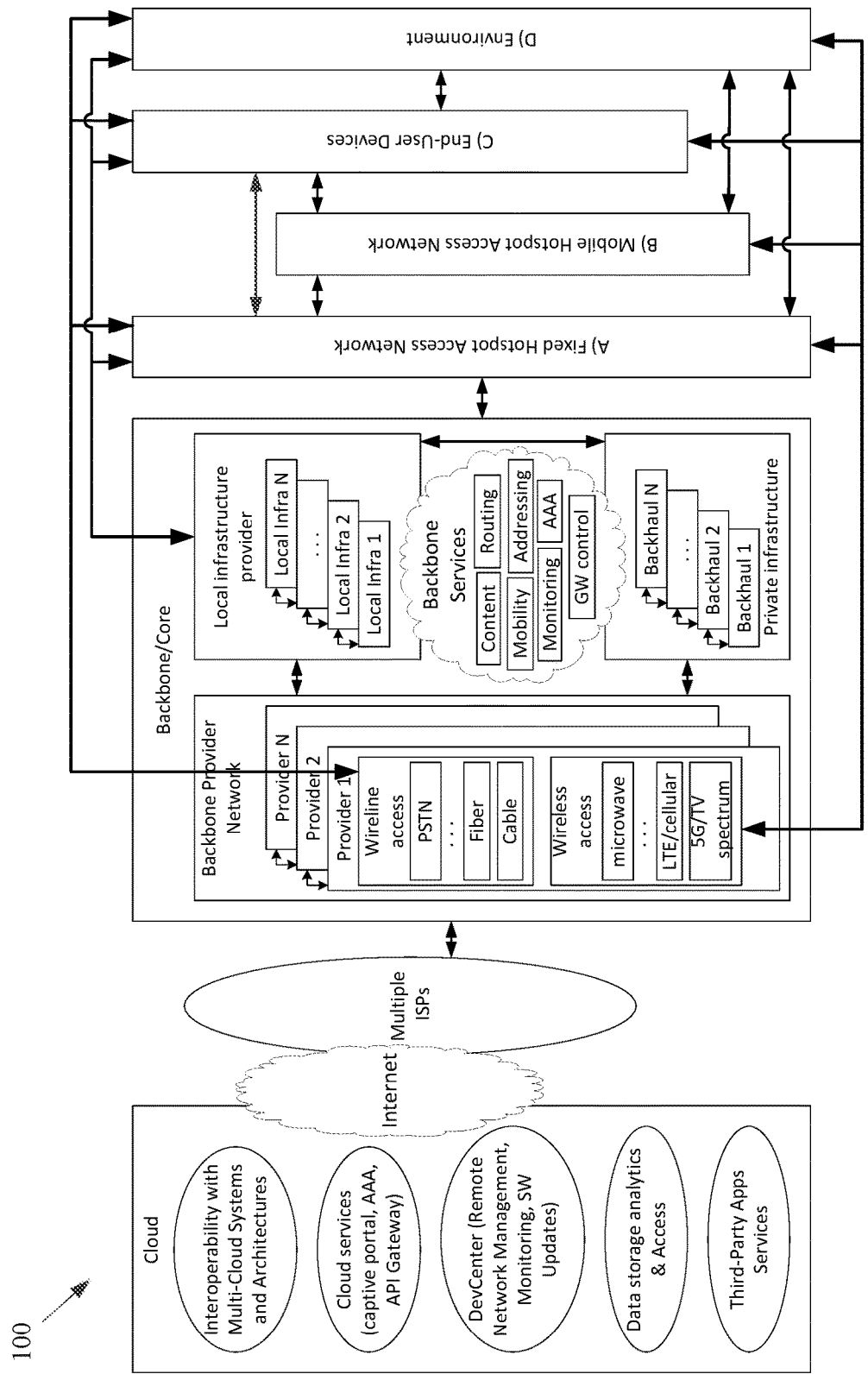
FIG. 1 shows a block diagram of a communication network, in accordance with various aspects of this disclosure.

Various aspects of this disclosure provide systems and methods for enhancing operation of entities in a network of moving things. As non-limiting examples, various aspects of this disclosure provide systems and methods to guarantee data integrity when building data analytics in a network of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
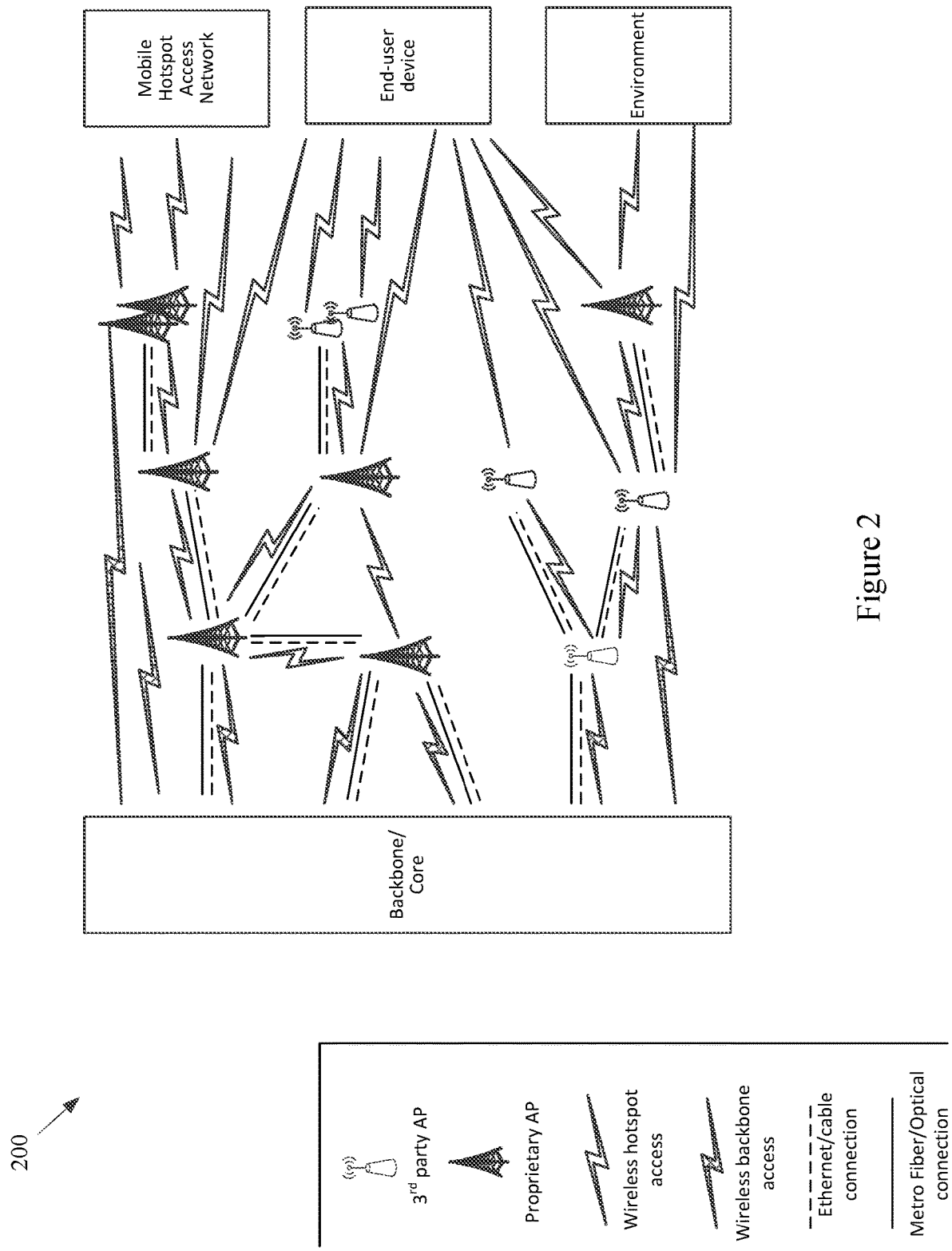
FIG. 2 shows various example characteristics of a Fixed Hotspot Access Network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
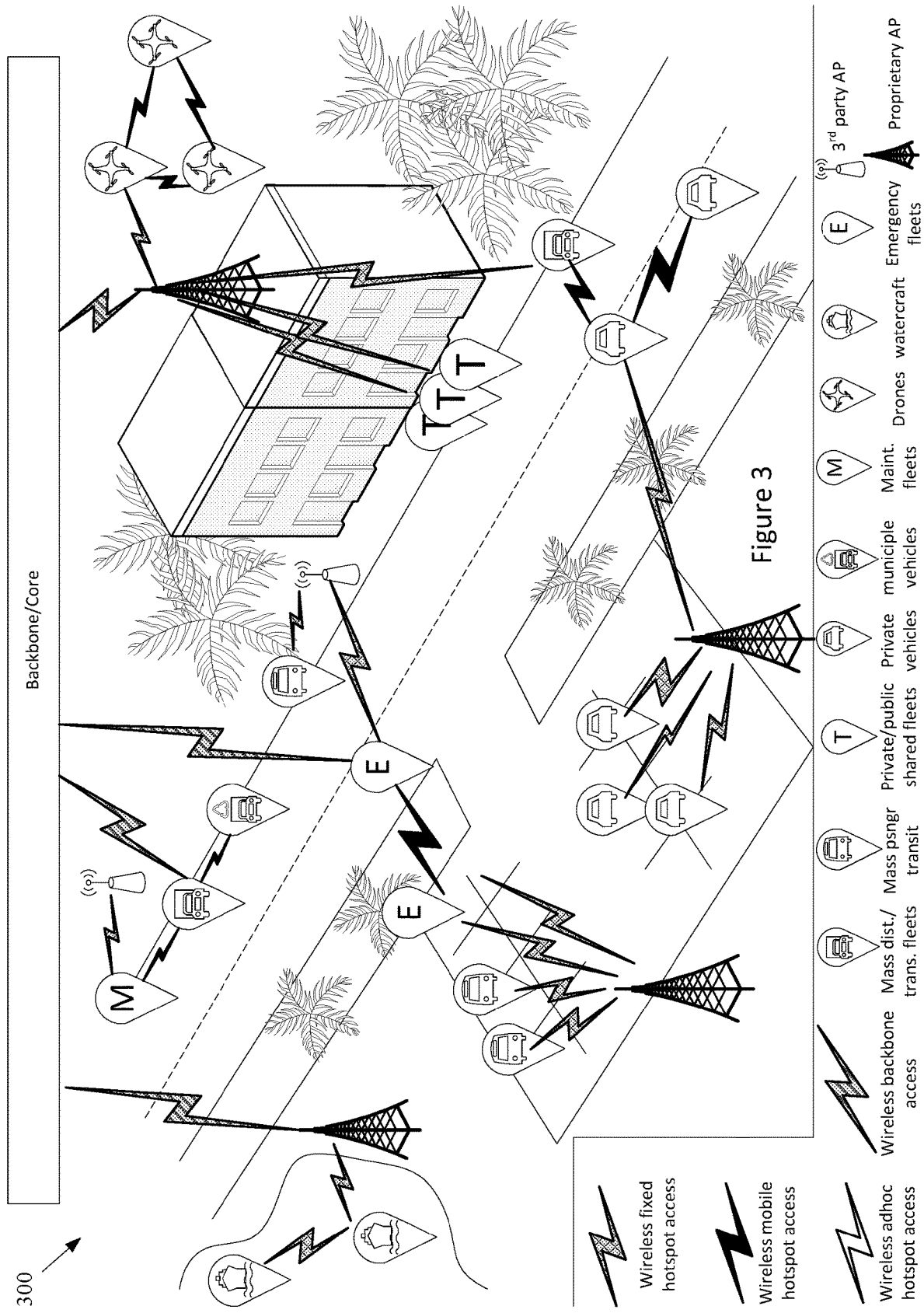
FIG. 3 shows various example characteristics of a Mobile Hotspot Access Network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
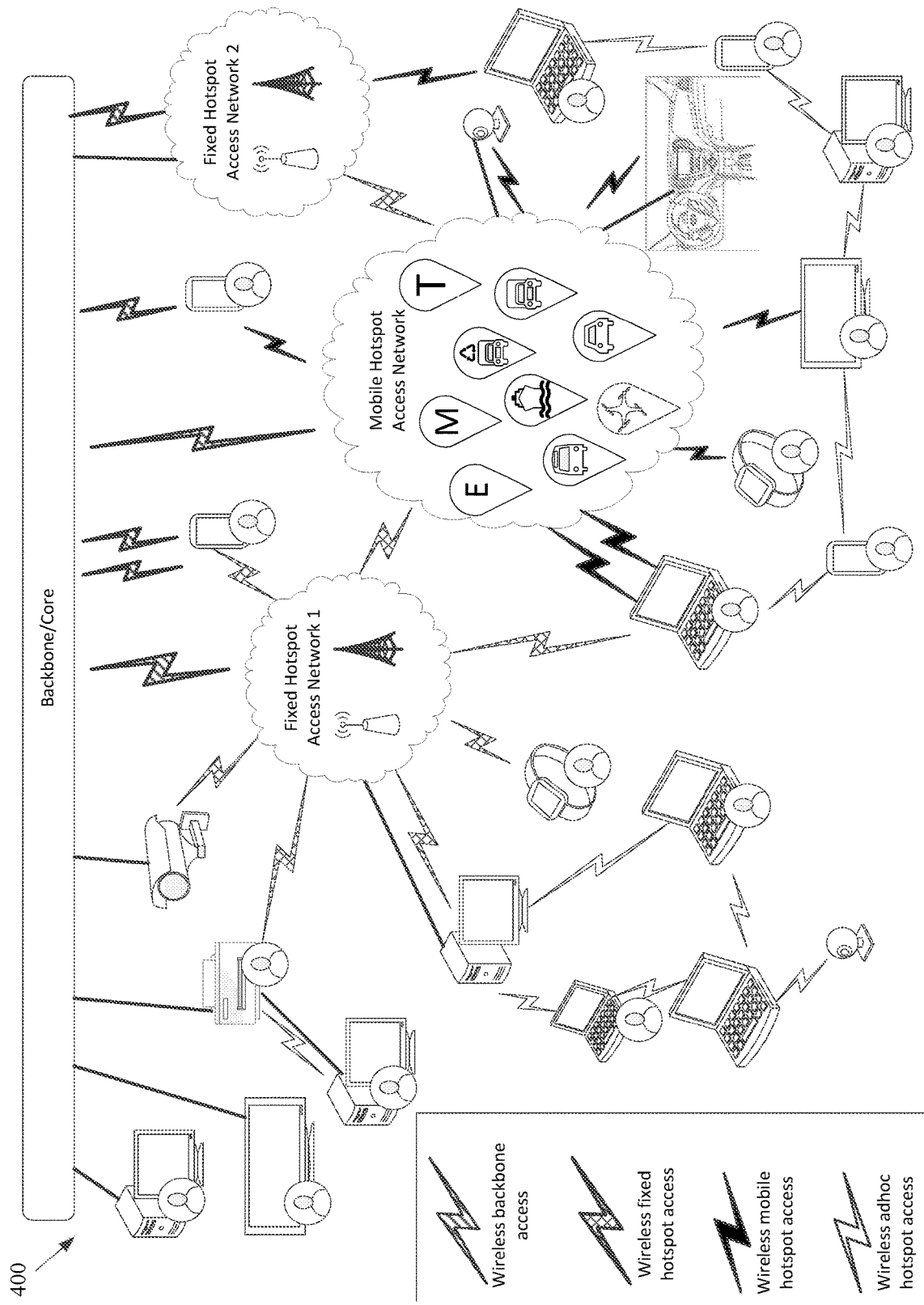
FIG. 4 shows various example end user devices, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
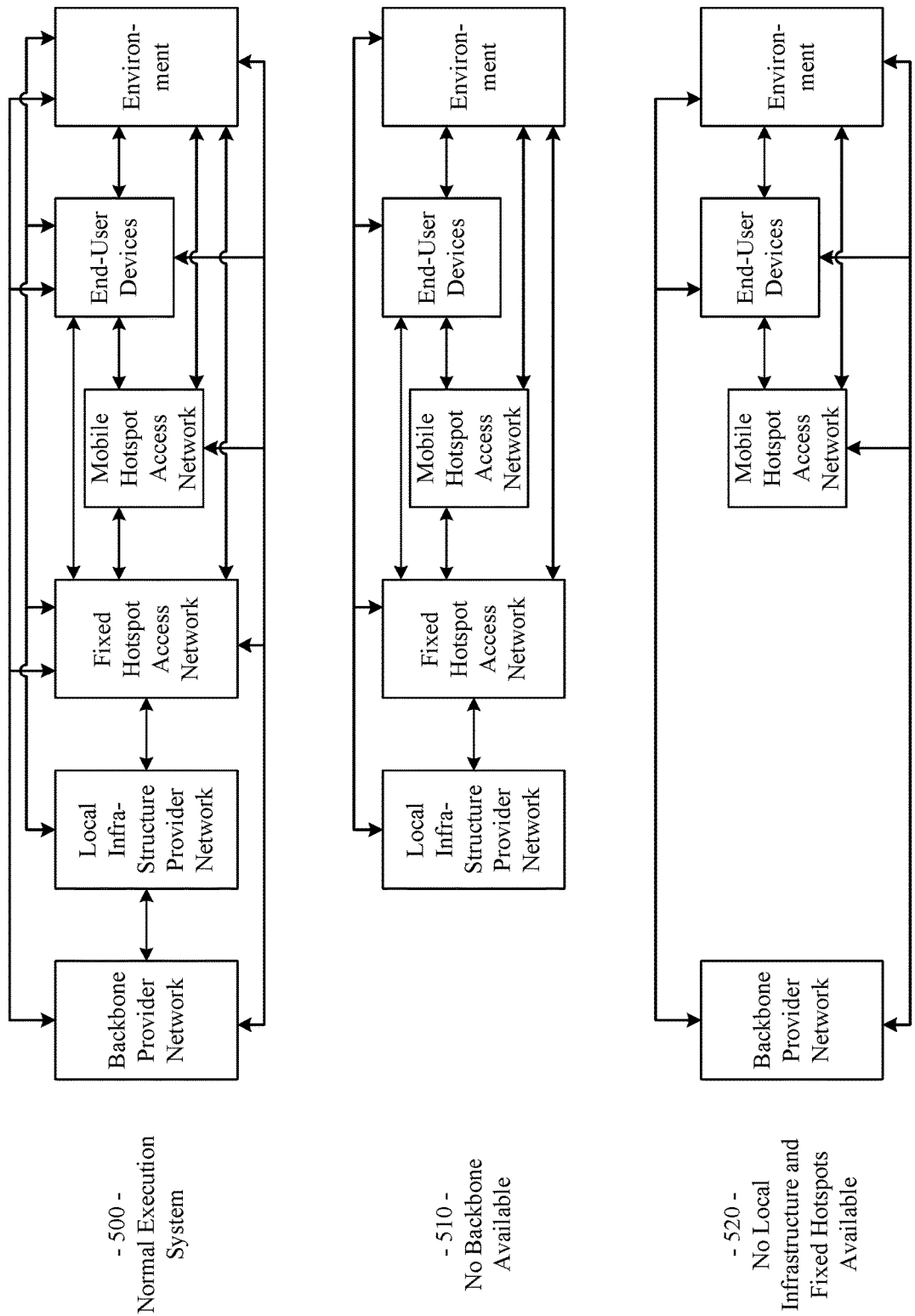
FIGS. 5A-5C illustrate network flexibility by providing example modes (or configurations), in accordance with various aspects of this disclosure.
Figure 5B:
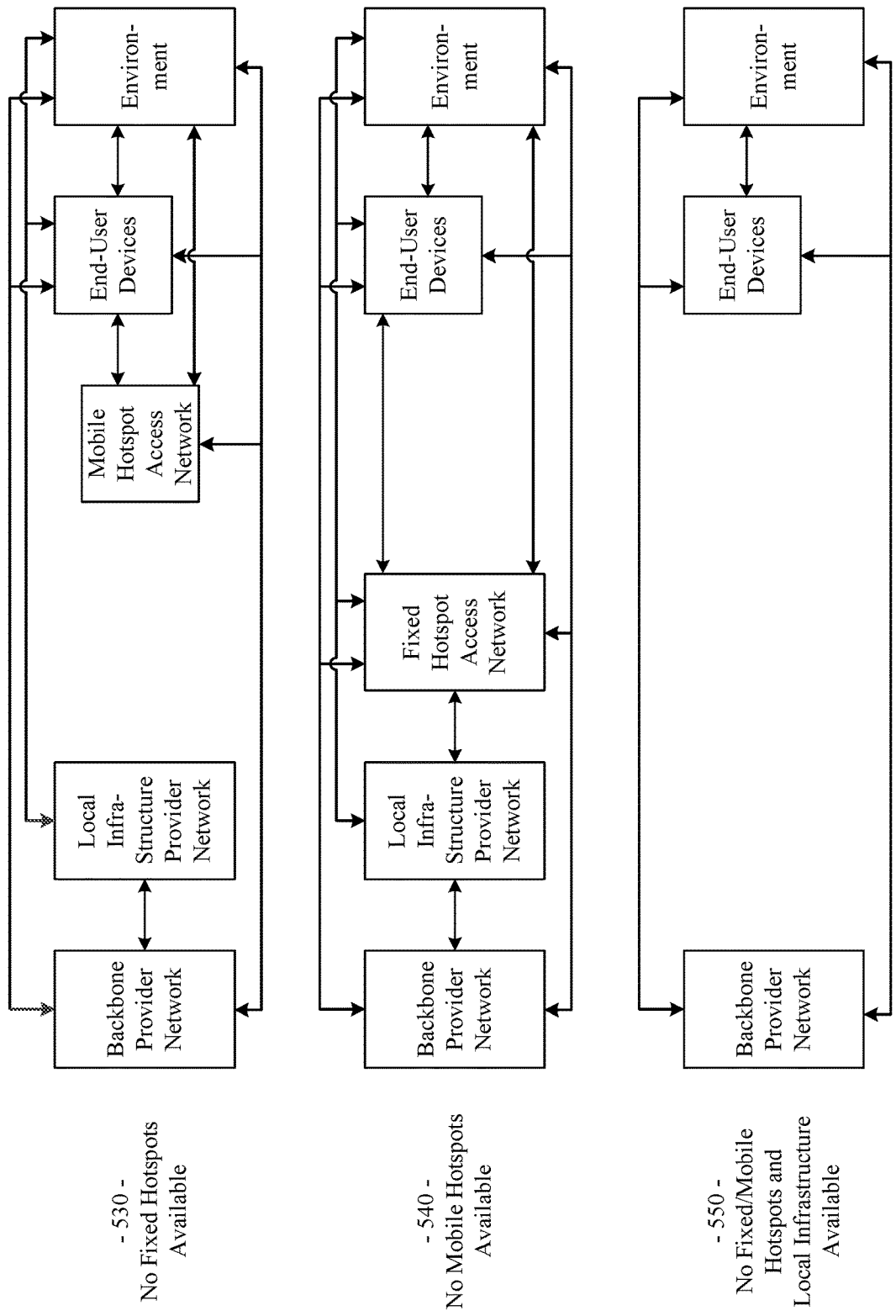
Figure 5C:
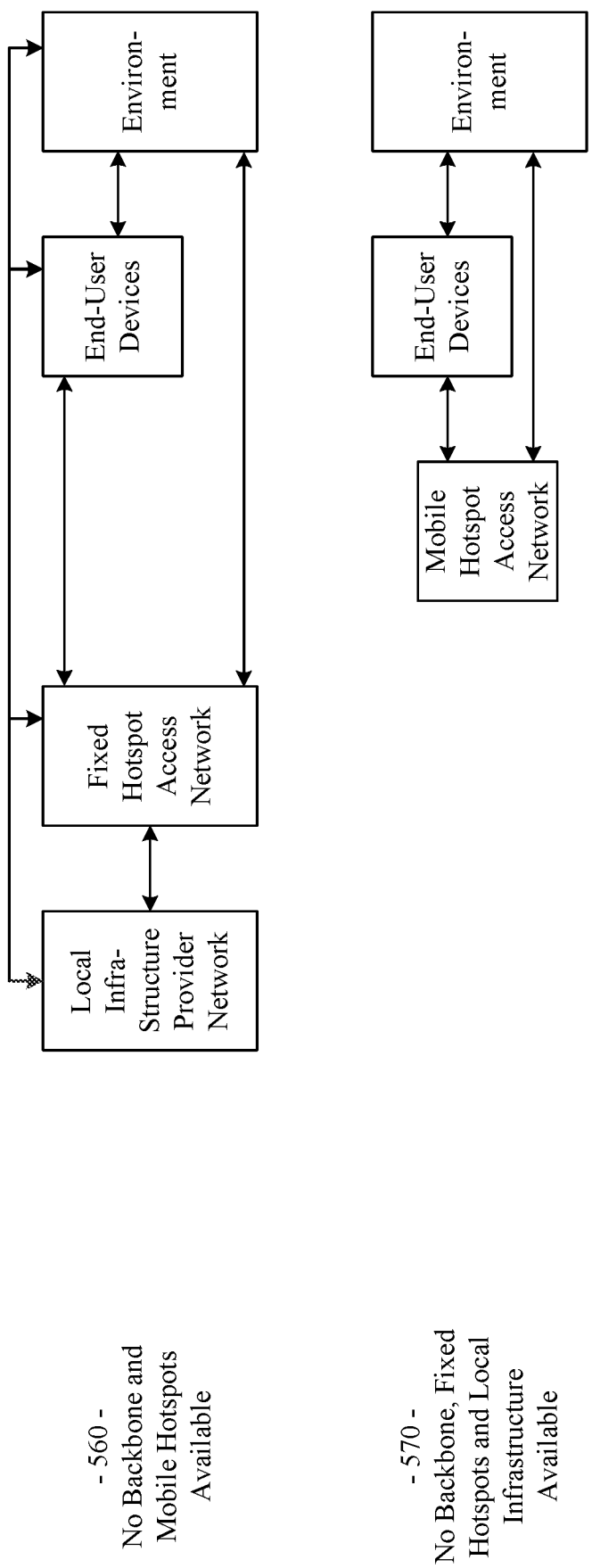

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
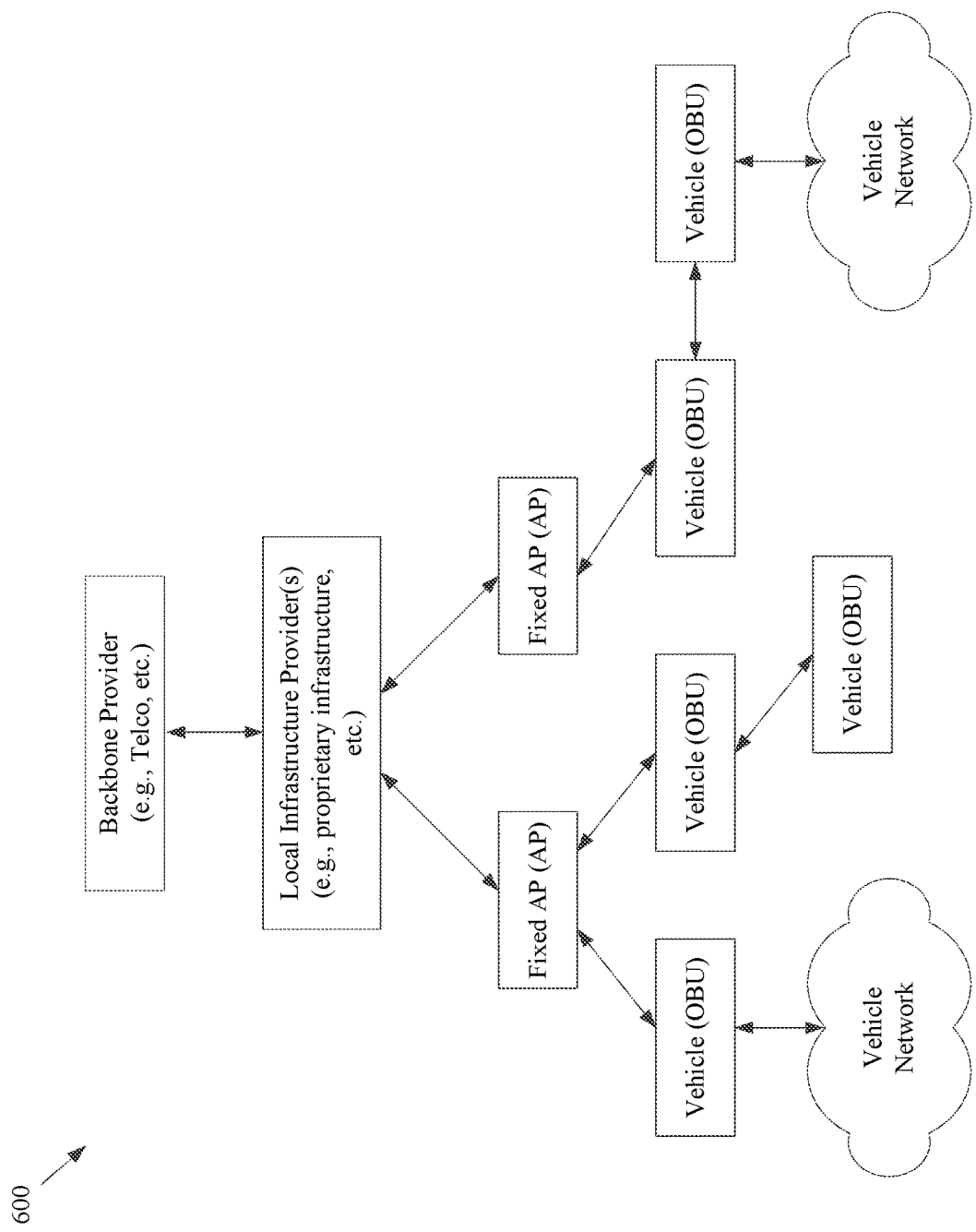
FIG. 6 shows yet another block diagram of an example network configuration, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSUs), where each Mobile AP may provide network access to a vehicle network (e.g., comprising other vehicles or vehicle networks, user devices, sensor devices, etc.).

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private networks, etc.

The functionality of the various fixed and mobile elements of a network of moving things may include software or firmware that is executable by processors, and may include data used by such processors that, for example, control the establishment and management of communication over the various wired and wireless links, communicate data between various elements, enable configuration of various elements according to the use of the network portions, provide services to end users, and perform diagnostics and maintenance of network elements. The software, firmware, and data of the various fixed and mobile elements of a network of moving things may, for example, be in the form of programs, modules, functions, and/or subroutines made of any combination of one or more of machine executable instructions, intermediate language instructions, interpreted pseudocode instructions, and/or higher level or script language instructions. In accordance with the present disclosure, a network of moving things may provide functionality that enables the network to continue to evolve after network deployment, enabling the distribution of updated software, firmware, and/or data that provides new features and enhancements in a curable and reliable manner. In accordance with the present disclosure, such update information for updating software, firmware, and/or data may be referred herein to simply as a software update, an "update," or "update file," and may include digital information representing a configuration of a network entity, software, firmware, and/or the arrangement of the network entities with respect to one another. Such updates may be created to update the software, firmware, and/or data at any granularity including, by way of example and not limitation, at one or more of the program, module, function, and/or subroutine levels. Such updates may be agnostic of the location and expected behavior, and may be totally adaptable to any constraints and requirements desired by the system operator or users.

Figure 7:
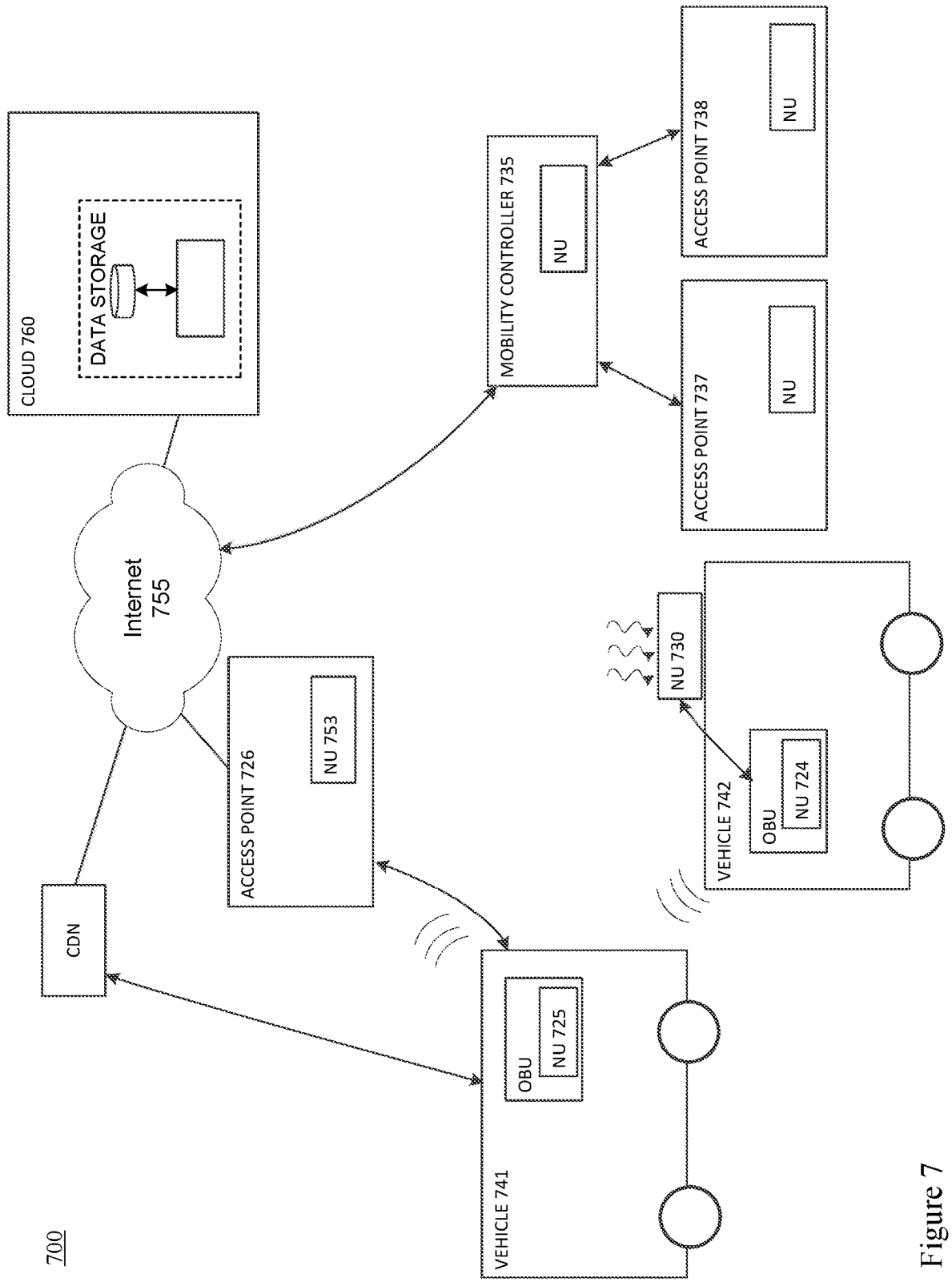
FIG. 7 shows a block diagram of an example communication network, in accordance with various aspects of the present disclosure.

FIG. 7 shows a block diagram of an example communication network 700, in accordance with various aspects of the present disclosure. The example network 700 may, for example, share any or all characteristics with the other example methods, networks, and/or network components 100-600, 800, 900, and 1000 discussed herein. As illustrated in FIG. 7, the network 700 includes a number of network components (e.g., Cloud 760; vehicles 741, 742; access points 726, 737, 738; and mobility controller 735). The vehicles 741, 742; the access points 726, 737, 738; and the mobility controller 735 each contain what may be referred to herein as a "network unit" (NU), represented in FIG. 7 as having respective NUs. In the context of a vehicle, the NU may be part of, for example, an OBU, an AP, and an MC, as previously described above.

In accordance with aspects of the present disclosure, the mobile NUs may have access to a number of communication methodologies including, for example, a "DIRECT" communication methodology that involves direct communication with the destination entity, an "OPPORTUNISTIC" communication methodology that communicates with the destination entity only when one specific communication technology is available (e.g., one of direct short-range communication (DSRC) connectivity to a specific access-point, Bluetooth wireless connectivity, or cellular connectively), and an "EPIDEMIC" communication methodology that may deliver the message to the next available networking neighbor of the entity sending a message. The networking neighbor that is sent the message is then responsible for continuing the delivery of the message to its own neighbor node(s), thereby transporting the message through various network entities until the final destination is reached. In accordance with various aspects of the present disclosure, a communication methodology may be chosen according to the time criticality and value of the information being transferred, and the cost effectiveness each of the communication methodologies. In accordance with aspects of the present disclosure, NUs that are "fixed" rather than "mobile" may be configured to rely on "DIRECT" communication methodologies. Additional details may be found, for example, in U.S. Provisional Patent Application No. 62/272,750, entitled "Systems and Methods for Remote Software Update and Distribution in a Network of Moving Things,", filed Dec. 30, 2015; and U.S. Provisional Patent Application No. 62/278,662, entitled "Systems and Methods for Remote Configuration Update and Distribution in a Network of Moving Things,", filed Jan. 14, 2016, the complete subject matter of each of which is hereby incorporated herein by reference, in its respective entirety.

A network of moving things in accordance with aspects of the present disclosure is able to communicate data with both mobile and fixed NUs. For example, the mobile NUs 724, 725 in their respective vehicles 742, 741 of FIG. 7, also referred to herein as mobile access points or mobile APs, may not have continuous access or communication with data storage of Cloud 760. In accordance with various aspects of the present disclosure, such mobile NUs may leverage any existing communication connections that are available. In accordance with aspects of the present disclosure, mobile NUs such as, for example, the NUs 725, 724 of their respective vehicles 741, 742 of FIG. 7 may, for example, communicate with fixed NUs such as, for example, the NUs 726, 737, 738 of FIG. 7, using the EPIDEMIC communication methodology, described above.

In accordance with various aspects of the present disclosure, various sensors (e.g., sensors connected to NU 730) may not have direct communication with the data storage of the Cloud 760, and therefore may leverage the connectivity provided by an NU such as, for example, the "relay" NU 724 of vehicle 742, to which they may connect. Such relay NUs (RNUs) may communicate with any such sensor, in order to enable any such sensors to communicate sensor data with, for example, the Cloud 760.

The ever growing volume of information generated by the huge variety of connected devices raises constant challenges in providing reliable transport for that data. Within a few years, with the continued proliferation of the Internet of Things and further deployment of smart sensors, the transportation of the growing volume of data generated by such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by, for example, various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things,", filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things,", filed Nov. 10, 2015. The complete subject matter of each of the above-identified provisional patent applications is hereby incorporated herein by reference, in its respective entirety.

As will be recognized by those of skill in the art, all of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

The inventive concepts presented in the present disclosure define an architecture that supports powerful and scalable analysis of the data acquired from a network such as, for example, the IoMT, and defines the methods and best practices to guarantee data integrity in the IoMT. Aspects of the present disclosure define techniques for data filtering, so that only valid data may be used in further analysis. The concepts disclosed herein may be used in combination with approaches to collecting sensor data such as, for example, those disclosed in U.S. Provisional Patent Application No. 62/222,135, entitled "Systems and Methods for Collecting Sensor Data in a Network of Moving Things," filed Sep. 22, 2015, the complete subject matter of which is hereby incorporated herein by reference, in its entirety. The concepts disclosed herein may also be used in combination with approaches to optimizing the gathering of data such as, for example, the inventive concepts disclosed in U.S. Provisional Patent Application No. 62/253,249, entitled "Systems and Methods for Optimizing Data Gathering in a Network of Moving Things," filed Nov. 10, 2015, the complete subject matter of which is hereby incorporated herein by reference, in its entirety. In combination with the above concepts, an implementation in accordance with the present disclosure defines a data analytic system comprehending data acquisition, transport, storage, and analysis. In this manner, the inventive concepts discussed herein provide the basic framework and methodology to analyze the performance of, and the data collected by, a network in accordance with various aspects of the IoMT discussed herein.

Figure 8:
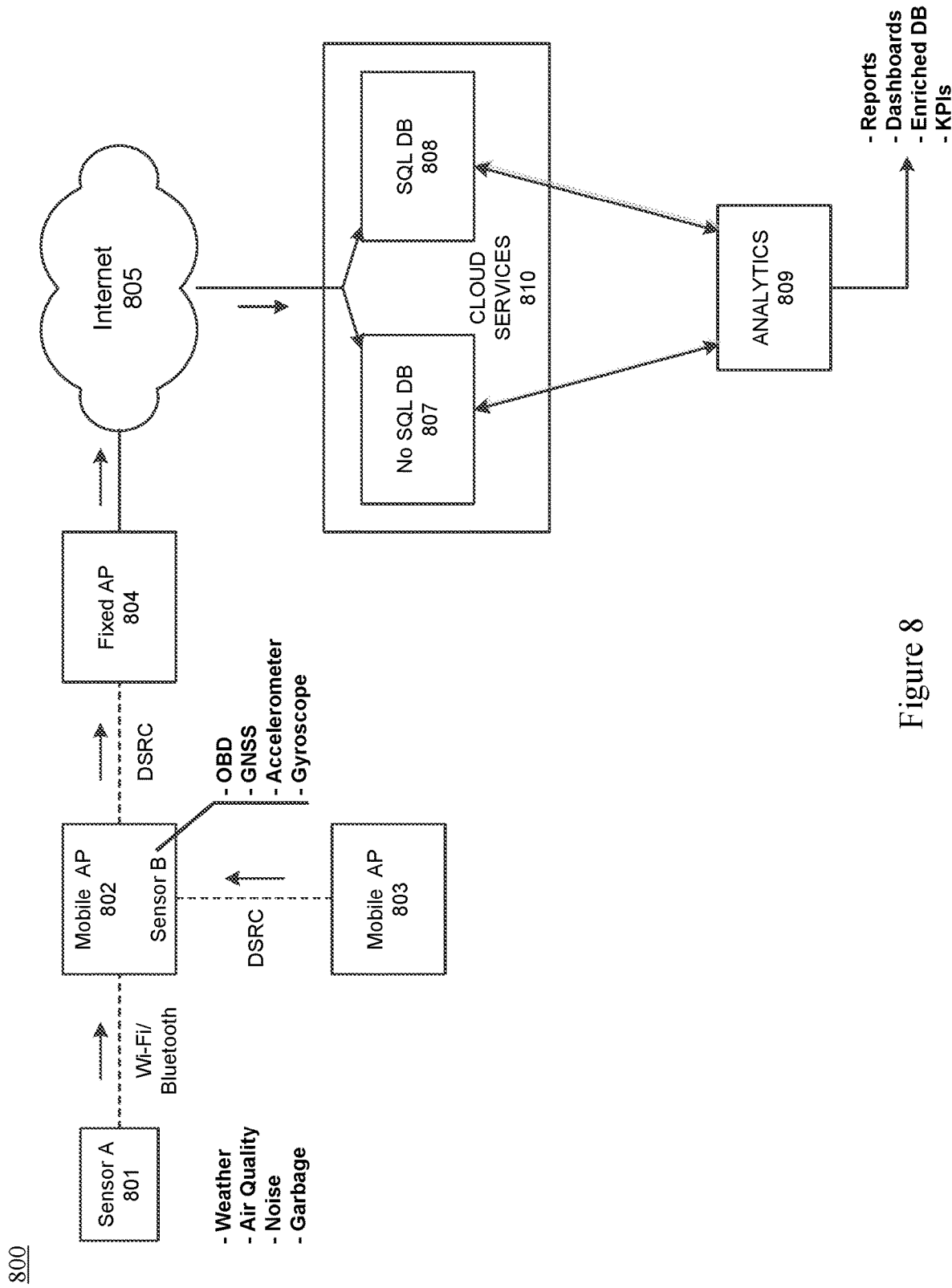
FIG. 8 is an illustration showing an example framework supporting data analytics in a network of moving things, in accordance with various aspects of the present disclosure.

FIG. 8 is an illustration showing an example framework 800 supporting data analytics in a network of moving things, in accordance with various aspects of the present disclosure. In the example of FIG. 8, data may be generated in each one of the network elements shown and described herein (e.g., mobile APs 802, 803, fixed AP 804, Internet 805, and analytics 809 and the Cloud services 810), which may correspond to the OBUs, fixed APs, local infrastructure providers and backbone provider, and cloud network elements, respectively, shown in FIGS. 1-7. In FIG. 8, arrows associated with communication paths are used indicate the primary flow of data. As shown in FIG. 8, the example framework 800 includes first and second mobile APs 802, 803, a fixed AP 804, cloud services 810, and an analytics entity 809. It should be noted that FIG. 8 is merely an example configuration of network nodes, and that many other configurations having a greater number of network nodes and elements (e.g., sensors, mobile APs, fixed APs, etc.) may be seen in a network of moving things in accordance with various aspects of the present disclosure. In FIG. 8, a "smart city" sensor such as, for example, the sensor A 801 may be linked to the first mobile AP 802 via a wireless communications path (e.g., Wi-Fi, Bluetooth, etc.). Sensor A 801 may be a sensor of any type including, for example, suitable circuitry, software, and logic to continually sense weather conditions (e.g., temperature, humidity, wind speed, precipitation, etc.), air quality (e.g., levels/concentration of carbon monoxide, nitrous oxide(s), pollen, hydrocarbons, etc.), environmental noise or traffic, or even information relating to pickup of garbage (e.g., a sensor indicating a level/amount of refuse in a container), to name only a few types of suitable sensors. The second mobile AP 803 of FIG. 8 is also linked via a wireless communications path (e.g., DSRC) to the first mobile AP 802.

The first mobile AP 802, in addition to receiving and forwarding the data or information from other sensors and APs (e.g., sensor A 801 and second mobile AP 803) to a fixed AP such as the fixed AP 804, may also include such data from their own operation (e.g., hardware and software debug logs, traffic counters/measurements, etc.) and sensors and devices such as, in the example of FIG. 8, an interface or sensor for receiving vehicle on-board diagnostics (OBD) information, a single or multi-axis accelerometer, a gyroscope, an altimeter, and enriched information from a global navigation satellite system/global positioning system (GNSS/GPS) receiver. APs such as, for example, the first mobile AP 802, the second mobile AP 803, and the fixed AP 804 may themselves generate a considerable amount of data during their operation, in addition to any data collected from sensors/devices/sources co-located with or remote from these network elements. In accordance with various aspects of the present disclosure, the data from such sensors/devices/sources may be collected and sent, for example in an opportunistic manner whenever possible, via a communication link to a network element such as, for example, the fixed AP 804, passed on to the Internet 805, and then forwarded to Cloud services element 810 for storage and immediate or future later processing. Alternatively, critical data/information may be sent via communication technologies other than those of the example of FIG. 8. For example, data may be transferred from, for example, mobile AP 802 to the databases 807, 808 of Cloud services via a cellular data link and Internet 805. Once the data/information from the various elements of FIG. 8 reaches the Cloud services element 810, the data may then be stored in a suitable database such as, for example, either or both of the two databases 807, 808 of FIG. 8, and may then immediately be available to be analyzed by analytics functionality such as, for example, the analytics element 809 of FIG. 8. Such analysis may result in the production of various reports, and may be available in the form of a "dashboard" or key performance indicators (KPIs), or in the form of an enriched database that may, for example, combine data from various sources to provide greater value to users.

It should be noted that each one of the previously described processes may lead to data loss or corruption. In some situations, sensors readings may be faulty although the communication between network elements is correct. In such instances, the information that is stored in the databases may end up being incorrect. In other instances, sensor information may be correct, but communication errors may occur, resulting in erroneous data arriving at the intended destination. In the constantly moving and changing wireless mesh network described herein, such errors are even more likely to happen.

In addition to the examples of data loss and/or corruption given above, data loss may also occur at the databases and cloud services, even though data loss there is less likely. A data analytics framework in accordance with the present disclosure employs database transaction operations that provide atomicity, consistency, isolation, and durability (ACID). In addition, database replication (e.g., via the use of different data warehouses) may be employed to avoid the loss of critical information. Additional details regarding suitable forms of data storage and processing may be found, for example, in U.S. Provisional Patent Application No. 62/222,168, entitled "Systems and Methods for Data Storage and Processing in a Network of Moving Things," filed Sep. 22, 2015, the complete subject matter of which is hereby incorporated herein, in its entirety.

It should be noted that data loss due to communication issues is not limited to the communication of data between elements of a network of moving things, such as between the first mobile AP 802 and the fixed AP 804 of FIG. 8, for example. Communication issues between processes running in the same network element may also occur. The various elements of a network of moving things each rely on a number of different applications that interact with each other. If for some reason (e.g., memory space issues, high CPU usage, software malfunction), a first application that produces information or data is not able to correctly transfer the information or data to a second application that is responsible for uploading the information or data to storage (e.g., a database of the Cloud service 810), the information or data may be lost.

Due to the limited computing resources that may be available in some network elements such as, for example, mobile APs, an embodiment according to aspects of the present disclosure incorporates reliable mechanisms to transmit information between processes. For example, an element in a network of moving things in accordance with aspects of the present disclosure may use buffers that hold information during periods of high CPU usage, and may employ acknowledgment mechanisms that ensure that information being transferred from one process to another or one element to another is not cleared from the sending process/element without verification that the receiving process/element has correctly received the information. In addition, the correct use of shared memory is important, not only for the proper functioning of applications and processes, but also to guarantee the integrity of the data or information when the information shared. Careful analysis may reveal such issues, as long as one can determine that no other cause of error is present. Unit testing mechanisms may be deployed to stress the developed applications and reveal possible issues in a very early stage.

A data analytics framework in accordance with various aspects of the present disclosure such as, for example, the example framework 800 of FIG. 8, is designed to be aware of all of these issues, so that the data analysis framework may detect data inconsistency and correct for such data inconsistency. On the analytics level, a data analytics framework according to aspects of the present disclosure is able to distinguish between information that is missing due to communication failures and information that is missing due to processing failures. In a network of moving things, loss of data due to communication failures is understandable, and may occur with greater frequency than the loss of data due to processing failures. It is, however, critical that these two situations be properly identified. Otherwise, determining the source of and correcting any misbehavior may be almost impossible. In accordance with various aspects of the present disclosure, a system as described herein employs multiple correlated sources of information, and both real-time and end-of-day verification of receipt of data samples, to enable the system to determine when data samples are missing, and to use information from a correlated information source as an alternate source of missing data samples. For example, a system according to the present disclosure may determine in real-time that a sample of data is missing from a source that regularly sends data samples, or the system may verify at an "end-of-day" or other point in time, that the correct number of samples have been received. In either instance, the system may use an alternate source of information that is correlated with the missing data, to reproduce the missing data sample(s).

A network of moving things in accordance with the present disclosure employs certain approaches (that may also be referred to as strategies, mechanisms, procedures, processes, and/or algorithms) to avoid various kinds of data loss and data inconsistencies in the communication and storage of data or information such as, for example, the data sourced and/or received by the various elements of the data analytics framework of FIG. 8. The various approaches employed in a network of moving things in accordance with the present disclosure may act in parallel (i.e., concurrently) and or sequentially, or any suitable combination, based upon the requirements of the network and the capabilities of the network nodes. The approaches disclosed herein may be configured for use based on a type of data that is being gathered and/or transferred, or based on the number of available sources of the data of interest. Due to the challenging nature of data communication in a network of moving things, and the attendant reliability issues that may be of concern, the approaches used to provide maximum data integrity in accordance with aspects of the present disclosure may depend on the type of communication mechanism or link used to transfer the data of interest, and a number of other factors. For example, many factors may be used to derive a probability of whether to configure a specific approach in a particular network node or group of nodes in a network of moving things in accordance with aspects of the present disclosure. Factors such as, for example, the speed of the vehicle in which a particular network node (e.g., a mobile AP) is located or of the vehicles served by a particular network node (e.g., a fixed AP), and various characteristics of the roads being traveled by the vehicles in which the network node (e.g., mobile AP) is located or of the roads served by a particular network node (e.g., fixed AP). Additional such factors may include the number of fixed APs and/or mobile APs within a certain physical distance from the particular network node (e.g., a mobile AP), and the line-of-sight/non-line-of-sight wireless communication conditions experienced by the particular network node (e.g., mobile AP or fixed AP) may also be used to derive a probability of whether to configure a specific approach in a particular network node or group of nodes in a network of moving things in accordance with aspects of the present disclosure.

In accordance with various aspects of the present disclosure, the periodicity of employing such approaches locally in particular network nodes or in the Cloud may be determined using, for example, the number of percentage of errors permitted for each type of data being communicated, and/or based on the usually observed number or percentage of errors experienced (i.e., expected reliability). Some applications running on the network may require that all data sent across the network arrives in a valid, error-free condition, while other applications may function properly or acceptably even when data is known to be valid only a part of the time (e.g., when valid data samples are only needed from time to time). In addition, network elements such as, for example, fixed APs may aid in the process of providing valid data, in that some network elements such as fixed APs and the Cloud may be configured to provide information such as, for example, correction vectors (e.g., provided by a Cloud-based service) for data that is currently being gathered and that needs to be made available to mobile APs such as, for example, correct number of sessions, received signal strength indicators (RSSI), or geographic location.

As mentioned above, a network of moving things in accordance with the present disclosure may employ a variety of approaches in regard to maximizing data integrity. For example, a network of moving things in accordance with the present disclosure may take advantage of known regularity and reliability of data sources that produce data samples according to a known schedule. Thus, such data sources may have what is referred to herein as "expected reliability." This approach to data validation may be applied to data sources that produce information that is updated on a regular periodic basis. In this case, if it is known that an element of the network of moving things (e.g., a sensor, mobile AP, fixed AP, etc. of an IoMT) should produce information at certain time intervals, for example, X seconds while in operation, the failure by a particular network element (e.g., a mobile AP or fixed AP that receives the data transfers) to receive a new transfer of data, or the presence of a gap in time between entries of a database of the respective cloud endpoint (e.g., Cloud services 810) greater than, for example X seconds, is an indication that information is missing, and corrective action may be warranted and taken.

In accordance with various aspects of the present disclosure, the data transferred from a source element to destination elements of a network of moving things according to the present disclosure may include redundant information that permits a receiver (e.g., a network element receiving digital data from a sensor, or a network node receiving a transmission from another network node) to verify the correctness of a received data transmission. Some sources of data may provide a checksum, hash value, or another form of information or code generated by applying a known algorithm, where the information or code is function of the data transmitted to the receiver, and that can be re-calculated at the receiver using the received data, to verify the accurate reception of the received information. The occurrence of errors at the receiver, detected via the use of such information, may indicate that actions are needed to improve communication links between network elements, or that particular portions of a wireless link is unreliable, and may permit the sending to the source of a request for retransmission of the data exhibiting the error.

In addition, a network of moving things in accordance with the present disclosure may employ checks on what may be referred to herein as "partial integrity." In a situation in which a data producer component (e.g., sensor A 801) provides incomplete information, such as may be determined by a local check of the information (e.g., by mobile AP 802), a message with the incomplete information may be sent to the respective cloud endpoint (e.g., Cloud services 810), such that the message is plainly marked to indicate that limited or incomplete information was received from the source, so that the database entry for the received information records that the absence of information is due to sensor malfunction, or due to reporting of intentionally incomplete information (e.g., as in the case of a GNSS/GPS receiver having too few satellites in view to enable the GNSS/GPS receiver to produce complete satellite-based geolocation information reports), and not due to communication failures.

A network of moving things in accordance with the present disclosure may also employ what may be referred to herein as "data source diversity." This approach may be used to detect data inconsistencies by determining a certain metric using two different data sources, if available. While this process may require more processing than other approaches, it can reveal problems in one of the data acquisition methods. An example of this is the acquisition and use of wheel sensor data available via a vehicle data bus accessible using an On Board Diagnostic (OBD/OBD II) data port, to verify vehicle travel distance using such information compared against information available using, for example, GNSS/GPS satellite-based position information.

For example, a network of moving things in accordance with the present disclosure may support improved communication reliability through the creation of a non-persistent sequence number for each message. The use of this technique allows elements of such a network to identify data loss during the process of communicating data from one network element to another through the network. The sequence number used by a network element may be reset at certain points in time such as, for example, when the network element is reinitialized. In this manner, communication issues are easily identified by the occurrence of a missing sequence number such as, for example, at an endpoint such as the example cloud services 810 network element of FIG. 8. For example, in accordance with various aspects of the present disclosure, the occurrence of sequence number resets may be cross-checked against an events database that is maintained for each network element, by checking the contents of the events database for the network element that experienced the reset, to confirm that the network element was reset due to, for example, a system reboot, rather than a failure of the network element or inter-element communication.

A network of moving things in accordance with the present disclosure may also employ what may be referred to herein as "data source reliability.' For example, in a situation in which a data producing component (e.g., sensor A 801) provides erroneous information, as determined by a local check of the information (e.g., by mobile AP 802), a message without sensor data content may be sent to the respective cloud endpoint (e.g., cloud services 810), so that the database entry records that the absence of information is due to sensor malfunction and not due to a communication failure.

A network of moving things in accordance with various aspects of the present disclosure may provide support for analytic processes that rely on data that is already stored (e.g., resident in a database), by defining a set of statistical data integrity principles or filtering procedures. Such statistical data integrity principles or filtering procedures may be used to refine the information used in the analysis. This approach identifies outliers that can occur, and evaluates the likelihood of occurrence of various values of the incoming data, taking into account the statistical distribution of historical data, and comparing data from several (e.g., redundant) data sources (e.g. GNSS/GPS, Radio Frequency (RF) Fingerprinting, and/or Dead Reckoning geolocation approached), and may use geographic boundaries of the information or data that has already been collected and stored.

A network of moving things in accordance with various aspects of the present disclosure may, for example, apply a particular subset of a larger set of data validation approaches such as those discussed above, to validate data that may be transferred via the elements of a network of moving things. The following discussion describes an example illustrating the use of some of the above-identified approaches for the acquisition of location-related information in an IoMT. For example, each mobile AP (e.g., mobile APs 802, 803 of FIG. 8) may be equipped with a GNSS/GPS receiver that produces positioning and satellite-related information on a regular basis (e.g., once every X seconds). In accordance with aspects of the present disclosure, such positioning and satellite-related information may be used not only for the correct tracking and visualization of the location of various network elements (e.g., mobile AP location), but may also be used as input to more complex positioning algorithms.

Such a GNSS/GPS receiver may also regularly (e.g., once every X seconds) produce a set of "sentences" (e.g., strings of bytes or characters representing various geolocation or time related parameters) that may from time to time be affected by an error. In accordance with aspects of the present invention, a checksum present at the end of each sentence produced by the GNSS/GPS receiver may be verified, so that a network element receiving the data may validate such data and locally discard erroneous location information.

In some instances, an information source such as, for example, a GNSS/GPS receiver may produce partial information. Such partial information may occur when, for example, a GNSS/GPS receiver attempts to determine its location and does not have a sufficient number of satellites "in view" (i.e., providing received satellite signals of sufficient strength). In such an instance, although some information may be provided by the GNSS/GPS receiver, the location coordinate information may not be provided. To aid in the analysis of information, a network of moving things in accordance with aspects of the present disclosure may record when partial geolocation information has been received at the database, to enable the network element(s) performing the analysis of received geolocation information to disregard any other issues that may occur such as, for example, communication errors.

A network of moving things in accordance with aspects of the present disclosure may employ the concept of "expected reliability," mentioned above. For example, because it may be known that a GNSS/GPS receiver provides a location/receiver information update on a regular periodic basis (e.g., every X seconds), at the point in time when analysis is performed, there should be available a GNSS/GPS receiver update for every regular time period (e.g., for every X seconds) that a mobile AP was in operation. Such a data source that produces information on a regular basis in time, allows checks to detect when that source is not operating normally, or that a data communication path through the network to a destination is not operating properly.

A network of moving things in accordance with aspects of the present disclosure may use redundant sources of data to be used to corroborate one information source against another. For example, an example system may compare the distance traveled as determined by using GNSS (e.g., GPS) information, with the distance traveled as determined using information available from other means such as, for example, the OBD accessible sensors/devices of a vehicle, to validate the information from those two data sources. More than two data source may be used in such data validation. In such an approach, although it may not be expected that the two or more data sources will produce exactly the same distance traveled value, or any other chosen metric, a considerable difference (e.g., a discrepancy above a certain threshold amount) will reveal issues in one of the data acquisition systems (i.e., the GNSS receiver and/or the OBD sensor/device).

By integrating the various types of information described above at the point in time when analysis of data is performed, it is therefore possible to determine those locations where, for example, a GNSS/GPS signal is poor and therefore that no location information is provided by the GNSS/GPS receiver, and those locations where there are typical data communication issues. By enabling the identification of such issues, the data integrity analysis and validation techniques of the present disclosure are a useful tool to debug a network of moving things (e.g., the IoMT) at different stages and layers, and to improve the reliability of data on an ongoing basis.

It should be noted that while the examples given above refer to the acquisition of data related to geolocation, the principles disclosed are applicable to many other sources of data, in many other networks of moving and/or stationary network nodes.

The following is an illustrative example of the use of a subset of approaches used for validation of data transferred between nodes of a network of moving things, in accordance with various aspects of the present disclosure. In this example, a subset of approaches selected from the set of example approaches discussed above may include four different data validation approaches. Example data validation approach 1 of the subset may check for data transmission errors by looking at a checksum portion of each packet received from the source. Example data validation approach 2 may check a sequence number of each packet received from a source to detect missing packets. Example data validation approach 3 may check the periodicity of data packets received from a source that is known to be periodic in production of data. Example data validation approach 4 may use one or more other data sources to validate or corroborate a particular metric represented by data in packet(s) received from a source. It should be noted that the above four data validation approaches are merely one subset of a large variety of approaches that may be used depending on the nature of the data source, the nature of the communication links in use for data transfer, and the available alternate data sources, and that the present disclosure is not limited merely to the above examples.

In accordance with various aspects of the present disclosure, the data validation approaches described above may be always available in the Cloud entities, the FAPs, and/or the MAPs of FIGS. 1-8, and may be turned-on (i.e., enabled or activated) or turned-off (i.e., disabled or deactivated) where and when desired (e.g., on a per-network node basis) or based on the context of the vehicular environment of the network of moving things. In this way, a network of moving things according to various aspects of the present disclosure may provide an automatic and adaptable system that is able to dynamically adapt the level of data validation checks performed in the network, and to personalize them based on the type of data (e.g., real-time or delay-tolerant), the communication technology or mode (e.g., IEEE 802.11p, cellular, IEEE 802.11a/b/g/n/ac/ad, etc.) or traffic characteristics (e.g., periodic, deterministic, correlated with other sources of information, etc.). Using these data validation approaches, processes, strategies, mechanisms, procedures, and/or algorithms, a network in accordance with aspects of the present disclosure supports quickly and deeply understanding whether a problem actually exists in the network, without introducing high network overhead and processing cost to keep those traffic validation operations always running.

The following examples illustrate situations in which it may be advisable to apply one or even a set including several of the approaches described herein. For instance, an example data validation approach 1 may be applied in the Cloud (e.g., Cloud 760, 809/810, 1060), and when application packet losses start to rise above a certain threshold that may, for example, be configurable per communication technology (e.g., DSRC, cellular, Wi-Fi, Bluetooth, etc.) and/or data type, instructions may be sent to, for example, FAPs, MAPs, and/or other network elements, to request them to begin monitoring packet checksum information, or to perform other actions, so that problematic communication links may be identified. In cases in which a MAP is located in a vehicle moving at a very high rate of speed or is performing frequent handovers between communication technologies (e.g., between DSRC, cellular, Wi-Fi, etc.) or switching among different APs, it may be advisable to raise the thresholds for the loss of application packets, before beginning to apply example data validation approach 1. For local applications, it may be advisable to apply approach 1 at the mobile AP, because the Cloud is not involved in the process.

The application of example data validation approach 2 may be used in situations where network interfaces employing IEEE 802.11p and cellular communication technologies are employed, and may involve the use of different thresholds for the analysis of the periodicity of the data (e.g., milliseconds in the case of IEEE 802.11p and seconds in case of cellular). The use of example data validation approach 2 may be appropriate when transfer of delay-tolerant data is involved, because packets containing such data may not arrive at the destination in order, and sequence numbers may be needed to determine whether data packets are missing and/or to restore packet order.

The use of example data validation approach 3 may or may not be appropriate when the data being communicated is not periodic in nature (e.g., when the data is delay-tolerant data). However, example data validation approach 3 may be appropriate for the validation of periodic data, and a network element (e.g., MAPs, FAPs, etc.) may be configured according to the expected periodicity of the data transfers. The periodicity of the data transfers to be process according to this approach may be learned by, for example, reviewing historical data transfer activity patterns gathered during previous data transfer activity, or from known characteristics of the network element that generates the data being transmitted.

In accordance with various aspects of the present disclosure, the example data validation approach 4 may be used to correlate metrics/data of interest with other sources of information in order to understand whether any issues of data validity exist. For example, if data received from (or lack of data received from), for example, network elements such as MAPs or FAPs suggests that there are no user traffic sessions (e.g., user Wi-Fi sessions) on a specific bus, during a particular period of time, or in a particular geographic region, validation of such data may be performed by checking whether the specific bus is in service and actually moving, or by checking whether there are user logins during that particular time period, or user traffic sessions on other buses currently in that geographic region. In addition, records of failed login attempts on, for example, a captive portal serving end users, may be used as a source of information with which to confirm the integrity of session traffic accounting information. It should be noted that in some situations, the use of example data validation approach 4 may involve levels of data processing resources and results may be delayed due to the process of correlating information from different DBs and information sources. For these reasons, the use of example data validation approach 4 may be appropriate when other approaches do not adequately diagnose a problem. Other data validation approaches may, for example, be employed until a certain threshold (e.g., packet loss-based), and then this data validation approach may be applied.

It should be noted that the example approaches for data integrity validation given above are provided for illustrative purposes only, and are not to be taken as an exhaustive collection of possible approaches to the validation of various type of data. The four approaches discussed above are simply an example subset of the set of all approaches that may be used to validate data from the wide variety of data sources available. In some instances, only one or two of the example approaches may be appropriate. In other network instances, with other types of data not discussed above, new data validation approaches may be devised, and the need to accommodate such different data validation approaches is anticipated by the concepts disclosed and discussed herein.

In accordance with various aspects of the present disclosure, the number of different approaches to be used in validating data integrity may be determined from, for example, the frequency or percentage of occurrence of errors that is acceptable, which may be different for each type of data. In some situations, the subset of different approaches to be used in validating data integrity may be based upon the number or percentage of errors that typically occur at a particular location or during a particular period of time (e.g., "busy hour" such as lunch, dinner, a popular soccer match) (i.e., expected reliability). As noted above, some applications of the network of moving things may require that all of the data for the application is valid at all times, while other applications may run satisfactorily when only a single sample of data is validated from time to time. For example, in a situation in which a mobile AP is moving at a very rate of speed, it may be possible to allow a high number of errors when the information is sent through fixed APs. The same may be true when a mobile AP is sharing the wireless medium with a large number of mobile and/or fixed APs.

In accordance with various aspects of the present disclosure, the number of integrity checks employed in a network of moving things may be dynamically configured based on, for example, the line-of-sight/non-line-of-sight (LOS/NLOS) wireless communication status of a mobile AP, the number of fixed APs and/or mobile APs near a particular network node or element, and/or the number of running software applications that currently require a specific type of data.

When data is not received correctly in a network such as the network examples described herein, particular actions may need to be taken to remediate the errors, instead of simply logging the observation that something is not working correctly. Some example actions that may be taken by elements of a network of moving according to the present disclosure include, for example, sending notifications to mobile APs to reset the affected software application, to notify local software applications that may be using such erroneous data, or to begin using other types of communication modes/technologies to send the data to the Cloud.

In accordance with various aspects of the present disclosure, a system experiencing loss of data may increase a sampling rate of the data subject to the loss, in order to have more samples reach the destination. In instances where data is lost or corrupted at the source or while traversing the network, a system such as that described herein may resort to the use of historical information stored on, for example, the Cloud (e.g., Cloud 100, 760, 809/810, or 1060 of FIGS. 1, 7, 8 and 10), or using data models that may be available, in order to derive the corrected data that should have been received. After deriving corrected data, such corrected data may be advertised to, for example, mobile APs and/or fixed APs within communication range. In addition, the elements of a network of moving things in accordance with aspects of the present disclosure may use sophisticated methods that look for and correlate others sources of information or, for example, derive additional/alternate metrics, to produce values for lost or corrupted data of a specific type.

Figure 9:
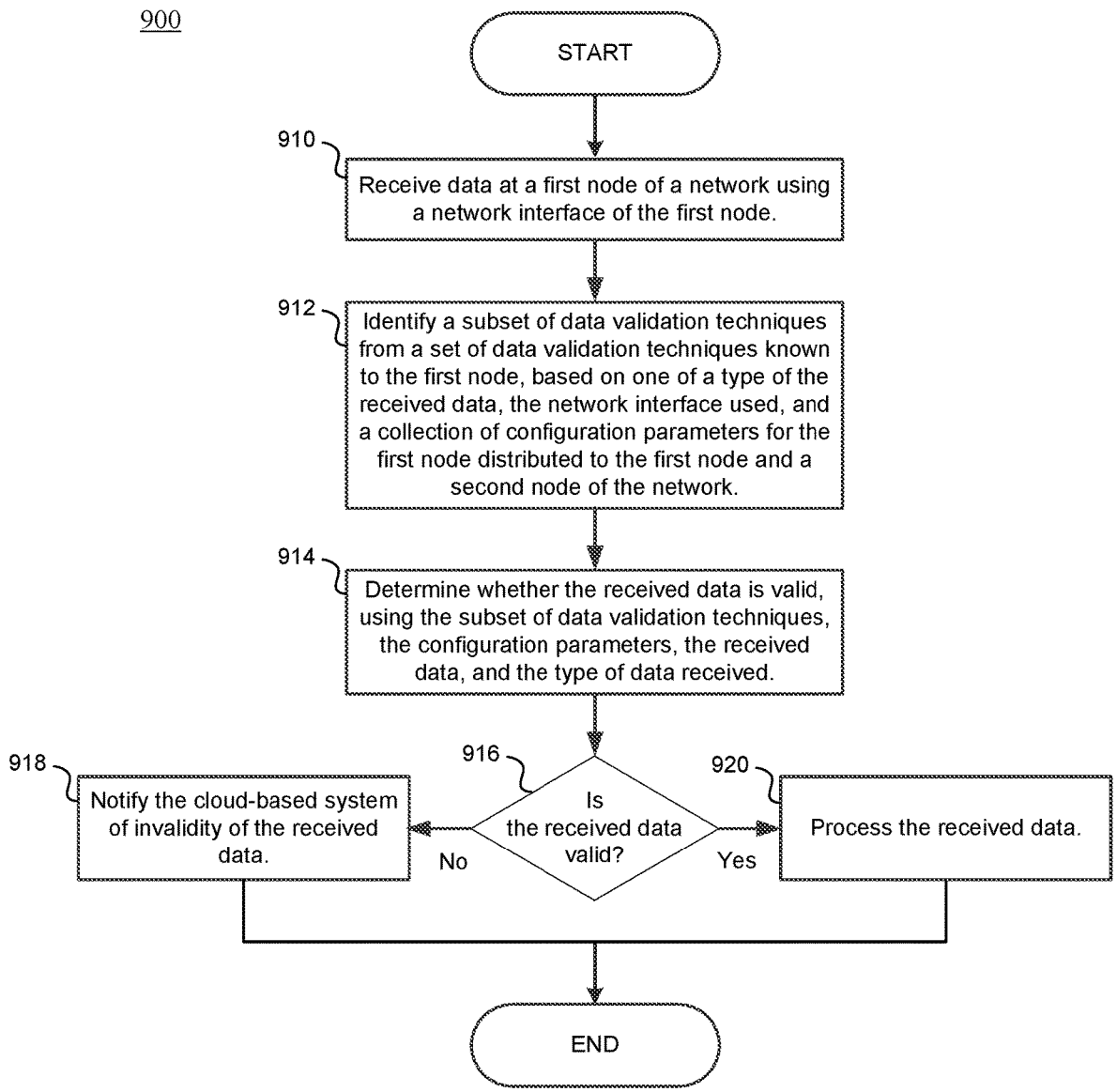
FIG. 9 shows a flowchart illustrating an example process of validating the integrity of data transferred received by a node in a network of moving things, in accordance with various aspects of the present disclosure.

FIG. 9 shows a flowchart 900 illustrating an example process of validating the integrity of data transferred received by a node in a network of moving things, in accordance with various aspects of the present disclosure. The actions represented by the flowchart of FIG. 9 may be performed by one or more of the network nodes (e.g., MAPs, FAPs, NCs) of the networks of FIGS. 1-8.

The example process of FIG. 9 begins at block 910, where a first node of a network of moving things receives data using a network interface of the first node. In accordance with aspects of the present disclosure, the first node may be, for example, a mobile AP, a fixed AP, or another network element of a network of moving things such as those depicted in FIGS. 1-8 and 10.

Next, at block 912, the process of FIG. 9 identifies a subset of data integrity validation approaches from a set of data integrity validation approaches known to the first node, based on one of a type of the received data, the network interface used to receive the data, and a collection of configuration parameters for the first node distributed to the first node and a second node of the network. In accordance with aspects of the present disclosure, the type of the received data may be any of the types of data described herein such as, for example, periodic, delay tolerant, and non-delay-tolerant, to name just a few examples. The type of the network interface used to receive the data may be one of one or more network interfaces of the first node for use in communicating via networks such as, for example, a DSRC, cellular, Wi-Fi, or other wireless network and/or a wired network interface compatible with, for example, an Ethernet (e.g., IEEE 802.3) or other suitable wired network standard. The configuration parameters may be a collection of information representing values for configuring the operation of the first node that may be derived by the first node from a shared configuration file distributed among the nodes of the network of moving things. Additional information about the use of such a configuration file may be found in, for example, U.S. patent application Ser. No. 15/138,370, titled "Systems and Methods for Remote Configuration Update and Distribution in a network of Moving Things," filed Apr. 26, 2016, the contents of which is hereby incorporated herein, in its entirety. Next, at block 914, the first node may determine whether the received data integrity is valid using, for example, the subset of data integrity validation techniques, the configuration parameters, the received data, and the type of data received. The process then continues at decision block 916.

At decision block 916, if it was determined that the received data is valid, the process of FIG. 9 is directed to continue at block 920, where the first node processes the received data. In accordance with various aspects of the present disclosure, processing the received data may include, for example, forwarding the received data to a particular software application or process in the first node, or to one or more other nodes of the network of moving things, in a suitable form (e.g., packets or bytes), using a network interface of the first node. Processing the received data may also or alternatively include storing the received data at the first node (e.g., in persistent storage), logging the receipt of the data for later reporting, analyzing the information represented by the received data, and/or reporting the receipt of the received data to another network entity (e.g., the Cloud). In this instance, the process of FIG. 9 then ends.

If, however, it is determined, at block 914, that the received data is not valid, the process of FIG. 9 then continues at block 918, where the first node may notify another element of the network of moving things. This may be a network element responsible for recording or monitoring the occurrence of data integrity issues or the occurrence of a problem at the first node in regard to the received data. Such notification may include, for example, information identifying the first node, the network interface via which the received data was received, the source of the received data (e.g., the identity of the sending network node, sensor, device, or other network element), a portion of the received data (e.g., a packet header), and other information usable to aid in resolving the detected data integrity issue. In this alternate path, the process of FIG. 9 then ends.

Figure 10:
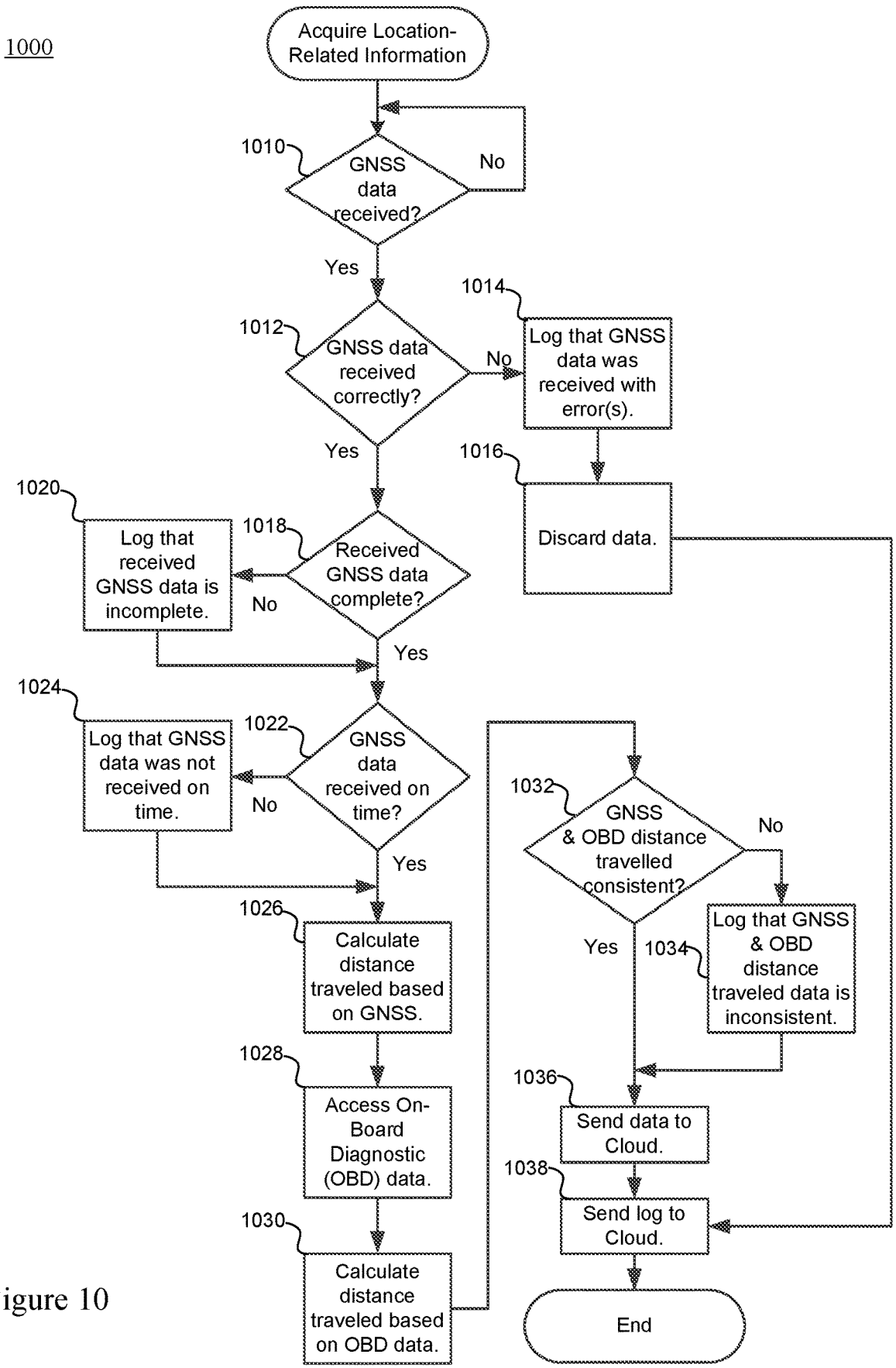
FIG. 10 is a flowchart illustrating an example method of validating the integrity of geolocation-related data received by a network node, which may correspond to, for example, the actions of FIG. 9, in accordance with various aspects of the present disclosure.

FIG. 10 is a flowchart 1000 illustrating an example method of validating the integrity of geolocation-related data received by a network node, which may correspond to, for example, the actions of block 914 of FIG. 9, in accordance with various aspects of the present disclosure. The example actions represented by the flowchart 1000 of FIG. 10 may be performed by one or more of the network nodes (e.g., OBUs/MAPs) of the networks of FIGS. 1-8 in regard to data from, in this example, a GNSS receiver.

The example method of FIG. 10 begins at block 1010, where a node of a network of moving things determines whether data from a GNSS (e.g., GPS) receiver has been acquired. If no GNSS data has been received, the method of FIG. 10 simply loops, waiting for data from the GNSS receiver. It should be noted that such "looping" may, for example, be implemented in a manner that does not block other actions by the network node, and may be implemented as the cyclic sleeping/awakening of a software process that implements the validation of data from the GNSS receiver, or as any technique of permitting other actions to take place and later return to perform the determination of block 1010 again. In accordance with various aspects of the present disclosure, the network node may be, for example, a mobile AP, a fixed AP, or another network element of a network of moving things such as those depicted in FIGS. 1-8. If it is determined, at block 1010, that GNSS data has been received, the method of FIG. 10 continues at block 1012.

At block 1012, the example method of FIG. 10 checks whether the GNSS data was received correctly, that is, without error. In the case of GNSS receivers, for example, many such receivers output "sentences" (e.g., strings of alphanumeric characters contain defined identifiers of the type of "sentence" and character strings representing various parameters and data produced by the GNSS receiver), typically at regular intervals. Such sentences may include information used for the detection of errors in the received string caused by the transmission path between the GNSS receiver and the recipient of such "sentences." The example decision at block 1012 checks such error detection information (e.g., a checksum or check character) to determine whether the GNSS output (e.g., "sentence") was received correctly. In accordance with some aspects of the present disclosure, for other type of data sources, the use of such a data validation action may not, for example, be configurable, appropriate, or necessary. If, at block 1012, it is determined that the GNSS data was not received correctly, the method of FIG. 10 then continues at block 1014, where the occurrence of reception of GNSS data with one or more errors may be logged and, at block 1016, the incorrectly received data may be discarded. The method of FIG. 10 then continues at block 1038, described below. However, if at block 1012 it is determined that the GNSS output was received correctly, the method of FIG. 10 may continue at block 1018.

At block 1018, the method of FIG. 10 determines whether the data that was correctly received from the GNSS data source is complete. That is, the action of block 1018 determines whether all components/pieces/parameters of the data (e.g., "sentence") from the GNSS source that should be present, are present. As discussed above, in the case of GNSS receivers, the data output (e.g., "sentences") may have multiple components/pieces/parameters. If, at block 1018, it is determined that not all components/pieces/parameters of the received GNSS data are present then, at block 1020, the method may log the occurrence of receiving GNSS data that is incomplete, and may pass control to block 1022. If, however, at block 1018, it is determined that the received GNSS data is complete, then the method of FIG. 10 continues at block 1022.

At block 1022, the method determines whether the data from the GNSS receiver (e.g., where "sentences" are sent regular intervals) was received "on time." If, at block 1022, it is determined that the GNSS information was not received according to the timing schedule for the GNSS receiver, the method may then, at block 1024, log the occurrence of the GNSS data not being received "on time," and may then continue the method at block 1026. Such a timing-related data validation technique may be configurable for data source various timing behaviors, depending upon the nature of the source of data. It should be noted that such timing-related checks may, for example, be performed on an ongoing basis, or may be performed at particular times during the day. For example, in accordance with some aspects of the present disclosure, a data integrity check may detect that data from a data source is late, at some point in time (e.g., within milliseconds, seconds, or minutes) after the data was expected to be received by the network node. In accordance with other aspects of the present disclosure, data integrity checks for such data may, for example, be done at any defined time such as "end-of-day," by reviewing stored data received from such data source(s), to verify that the proper (e.g., expected) number of data entries or samples have been received or are present in storage. If, however, at block 1022, it is determined that the GNSS information was received according to the timing schedule for the GNSS receiver, the method may then continue the method at block 1026.

At block 1026, the network node performing the example method of FIG. 10 may calculate distance traveled, based on the received GNSS data, if the network node is mounted in a vehicle (e.g., an OBU/MAP). The network node may then access data from other data sources (e.g., wheel rotation sensors) of the vehicle, which may be used, at block 1030, to compute distance traveled over the same time interval as the information output by the GNSS receiver. Such vehicle sensor information may be available, for example, via an onboard diagnostic (e.g., OBD/OBD-II) port available on many motor vehicles. Then, at block 1032, the method may then determine whether the distance traveled according to received GNSS data is consistent with the distance traveled according to received vehicle sensor data. If the distance traveled using the two different data sources is not consistent, the method of FIG. 10 may then log the occurrence of the inconsistency, and may continue at block 1036. If, however, at block 1032, the distance traveled using the two different data sources is found to be consistent, the method of FIG. 10 may continue at block 1036. At block 1036, the method may then make the GNSS (e.g., or other sensor) data available to functionality of, for example, appropriate Cloud-based system(s) or other network elements (e.g., network nodes), and at block 1038, may send any log entries generated during the data integrity checks of the method of FIG. 10 (e.g., at blocks 1014, 1020, 1024, 1034) to appropriate Cloud-based system(s) or other network elements. The example method of FIG. 10 is then finished for the data currently received from the GNSS data source.

If should be noted that the data integrity checks of the example method of FIG. 10 such as, for example, those of blocks 1012, 1018, 1022, 1032 are examples of only a few of many types of data integrity checks that may be used in systems and methods in accordance with the present disclosure, and that the use of various combinations of such a variety of data integrity verification approaches may be configured for each different type of data source. That is, while the example of FIG. 10 uses four data integrity checks, for reasons of simplicity in illustrating these concepts, various combinations of data integrity checks selected from a large variety of data integrity verification approaches may be selected and configured for various types of data sources, in accordance with aspects of the present disclosure. Such configuration may be done at any time, and may be done locally to the network node or remotely from, for example, a Cloud-based system, according to the needs and desires of the operator and/or the customer/clients/users of a network of moving things in accordance with the present disclosure.

Figure 11:
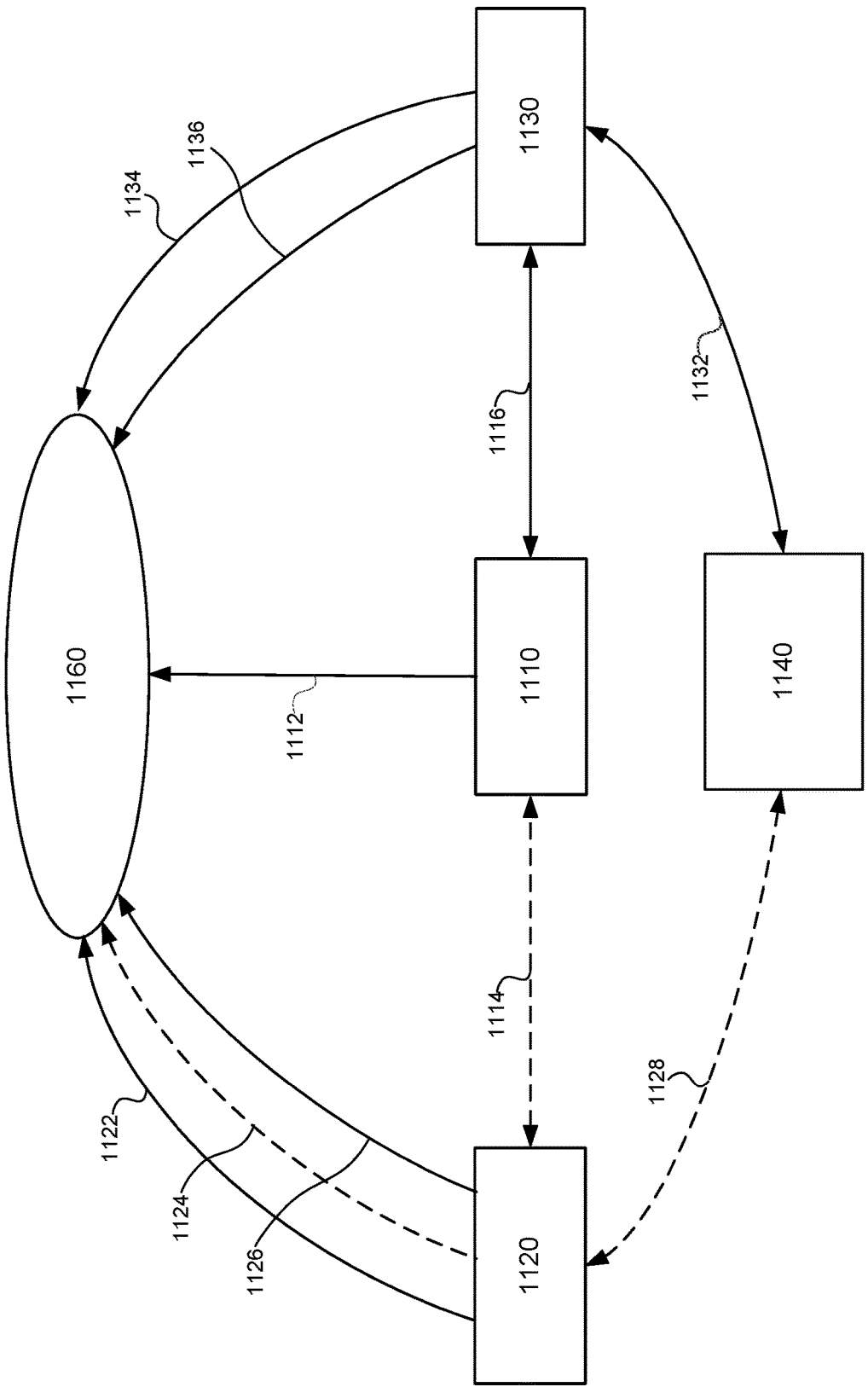
FIG. 11 is a block diagram illustrating an example framework for accounting activities that monitor data traffic in a network of moving things, in accordance various aspects of the present invention.

FIG. 11 is a block diagram illustrating an example framework for accounting activities that monitor data traffic in a network of moving things, in accordance various aspects of the present invention. As illustrated in the example of FIG. 11, the network of moving things may include a Cloud 1160, one or more fixed APs (FAPs) 1110, one or more mobile APs (e.g., MAPs/OBUs) 1120, one or more network controllers (NCs) 1130, and one or more cellular networks 1140, which may correspond to the Clouds, fixed APs, mobile APs, network controllers, and cellular networks shown and discussed above with regard to FIGS. 1-8. FIG. 11 also shows a number of communication links that couple various elements of FIG. 11. The communication link(s) 1114 couple the fixed APs 1110 and the mobile APs 1120 and may be, for example, IEEE 802.11a/b/g/n/ac/af/p (e.g., Wi-Fi, DSRC) wireless communication links. The communication link(s) 1116 that couple the fixed APs 1110 and the network controllers 1130 may be, for example, any suitable wired or wireless communication links discussed herein with regard to communication between those elements. The communication link(s) 1128 that couple the mobile APs 1120 and the cellular network(s) 1140 may include, for example, data communication links using any suitable cellular air interface (e.g., CDMA, TDMA, GSM, UMTS, 4G LTE, 5G, etc.). The communication link(s) 1132 that couple the cellular networks 1140 and the network controllers 1130 may be, for example, any suitable wired or wireless communication network. The illustration of FIG. 11 also shows a number of different logical streams of traffic accounting data 1112, 1122, 1124, 1126, 1134, 1136 that flow from software applications running in the mobile APs 1120, the fixed APs 1110, and the network controllers 1130 that communicate with services/application in the Cloud 1160. That traffic accounting data is carried from the mobile APs 1020, fixed APs 1110, and network controllers 1130 over the illustrated communication links 1114, 1116, 1128, 1132 to the Cloud 1160 during a traffic accounting process described in greater detail, below.

A network of moving things in accordance with various aspects of the present disclosure may include what may be referred to herein as a "traffic accounting framework." Such a traffic accounting framework may include one or more software applications that run on various network nodes (e.g., mobile AP/OBU, fixed AP/RSU, network controller (NC)). A first such software application may, for example, use a set of "rules" or "policies" for each network interface on the network node, to enable it to monitor and periodically report via, for example logical data streams 1122, 1134 of FIG. 11, the amount of data traffic (e.g., user or system data traffic or "packet traffic") passing through each network interface of the network node such as, for example, the number of inbound and outbound packets and/or bytes of data being sent/receive that match each rule/policy. The term "logical data stream" may be used herein to refer to a series of data transfers that may or may not require or involve the use of a dedicated physical (e.g., wired and/or wireless) link, but may be carried with other digital information such as, for example, various system parameters, control information, and/or end-user data. Rules and/or policies such as those described herein may, for example, be expressed in a form accepted by a firewall utility such as, for example, the IPTables utility that is available for use with various distributions of, for example, the Linux operating system. For example, on a mobile AP, rules/policies may be defined that permit the first software application to differentiate traffic per interface by the type of wireless interface via which the data traffic was communicated such as, for example, a cellular data link, a DSRC data link, and/or a Wi-Fi data link (e.g., IEEE 802.11a/b/g/n/ac/ad/af). A traffic accounting framework in accordance with various aspects of the present disclosure may support monitoring and reporting via, e.g., logical data stream 1122, the data traffic transferred between network nodes such as, for example, OBUs and various traffic monitoring applications, which may also be differentiated by the type of network interface used (e.g., via cellular, Wi-Fi, or DSRC). In the case of fixed APs (e.g., fixed APs 1110), a particular network of moving things according to aspects of this disclosure may, for example, only monitor (i.e., measure) the data traffic that it is forwarded by the fixed AP between the DSRC interface of the mobile APs and the network controllers. In accordance with aspects of the present disclosure, network controllers such as the NCs 1130 of FIG. 11 may monitor (i.e., measure) and periodically report, via logical data stream 1134, all of the data traffic received and sent at their certain network interfaces (e.g., a "tunnel" interface) such as, for example, DSRC and/or cellular network interfaces, and may be able to differentiate the data traffic sent through according to each traffic monitoring application/source. In accordance with various aspects of the present disclosure, software applications running on the various network elements (e.g., OBUs/MAPs, FAPs, NCs, etc.) may send information to functionality using various APIs of a Cloud-based resource (e.g., the Cloud of FIG. 1, Could 760 of FIG. 7, or the Cloud elements of FIG. 8) employing the communication methodologies discussed herein. In accordance with some aspects of the present disclosure, some APIs and services may be available in network elements such as, for example, MAPs, FAPs, NCs, etc., in a system employing fog/distributed computing. In accordance with aspects of the present disclosure, information from different information sources may be reported to distinct APIs, thereby isolating problems and easing debugging of design/operational issues.

A network of moving things in accordance with various aspects of the present disclosure may include a second software application that runs on a network controller (e.g., NCs 1130) and that performs monitoring (i.e., measurement) and periodic reporting of inbound and outbound data traffic via, for example, logical data stream 1136, from the network controller (e.g., the NCs 1130), per mobile AP. Such a software application may, for example, differentiate data traffic for various network interfaces of a network controller, for each mobile Wi-Fi (e.g., IEEE 802.11a/b/g/n/ac/ad/af) user, and may differentiate that data traffic from data traffic generated by, for example, normal/typical OBU/MAP operation. It should be noted that the monitoring and reporting functionality described herein may be introduced into networks of moving things in which other, different network monitoring and reporting mechanisms may be in use, and that the concepts disclosed herein may be used in combination with those alternate or existing approaches.

In accordance with various aspects of the present disclosure, additional traffic accounting applications running on various network elements may also perform various measurements and monitoring of network traffic at various granularities and aggregations, and may report such information via additional logical data streams such as, for example, logical data streams 1124, 1126, which may be also used by functional elements at, for example, the Cloud 1160, as references for the traffic accounting system described herein. For example, these additional logical data streams may be used with other sources of data described herein, to perform cross-comparisons and/or other consistency checks, and that information identifying geographic locations at which and/or communication links on which data loss is detected are noted, so that such information may be used in scheduling the transfer of data from various network elements to the Cloud 1160, in a manner and time to help avoid transfers of data when in those geographic locations or when in an area served by the communication links on which data loss has previously been detected, to aid in assuring that data loss is minimized so that data integrity is maintained.

In a network of moving things in accordance with various aspects of the present disclosure, validation of a traffic accounting framework such as described herein may consist of analyzing the traffic accounting measurements provided by the accounting applications located at the different network nodes (e.g., MAPs, FAPs, NCs, etc.) as described above, as well as comparing the results of such traffic accounting measurements against other references that may be available, such as those that may be available from other, more basic traffic validation checks. For instance, in accordance with various aspects of the present disclosure, traffic validation may consist of determining whether aggregated traffic measurements over, e.g., DSRC and cellular network paths measured at all MAPS/OBUs match measurements reported by, e.g., the network controllers of the overall network. In addition, measurements of end to end traffic, such as traffic measurements monitored at the OBUs/MAPs, may be compared to the measurements reported by other network traffic monitoring approaches. While the measured traffic using different traffic accounting approaches would ideally be the same, aspects of the present disclosure permit the concurrent employment of such different approaches which aid in detecting and resolving discrepancies that may be observed due to various sources of packet losses such as, for example, in links employing wireless communication.

A traffic accounting system in accordance with various aspects of the present disclosure may be configured to provide traffic differentiation granularity per communication technology (e.g., per wired interface or wireless air interface), per API, per user, per network element, etc.). Such a system supports measurement of overall packet losses of a network of moving things with confidence in the accuracy and also may be configured to provide a breakdown of network traffic at the per-OBU/MAP level, and permits further analysis to be performed based on the traffic accounting metrics described herein, to permit system operators to evaluate the performance of the various network nodes (e.g., OBUs/MAPs, FAPs/RSUs, and the overall vehicular network in general. The use of a variety of different traffic measurement mechanisms enables an operator of a system in accordance with the present disclosure to compare and validate different communication links of the system, thus permitting the operator to assess the integrity of a network of moving things as a whole.

By employing the traffic accounting approach described herein, an operator of a network of moving things, or other data communication networks as well, can detect and validate problems with any network element in the network, in any specific communication link such as, for example, between mobile APs and fixed APs, between fixed APs and network controllers, between network controllers and the Cloud, or between Mobile APs and the Cloud, in any communication technology, in any network interface or API, or with any end-user. This is possible because a traffic accounting system in accordance with the present disclosure can measure data traffic separately in various elements of the network (e.g., MAPs/OBUs, FAPs, NCs, etc.), verifying communication links and data interconnections of the system, including APIs.

It will be recognized by those of skill in the art that a complex system such as those described herein may be subject to many causes of failure, and that a well-designed analytics framework such as that disclosed herein is valuable for the correct operation and debugging of the procedures and interactions between elements. By employing the techniques and approaches described in the present disclosure, reliable and consistent data is collected and stored, and only valid information may be selected as input for complex analytic systems that may include "Big Data" clustering and machine learning, where information reliability is crucial for the correct training of such machine learning mechanisms. A reliable and consistent information database is also critical for many decision processes and key performance indicators. An important aspect of the present disclosure is the ability to configure any chosen subset of data validation approaches for use in validating the integrity of any source of data, and to automatically and dynamically select, adjust, or configure the data validation approaches used and their operation, based on observed conditions in a network of moving things.

In accordance with aspects of the present disclosure, inconsistent data and outliers collected by elements of a network of moving things are removed before the analysis process begins. By improving the reliability of collected data, a network of moving things in accordance with the present disclosure (i.e., an IoMT) enables users of the collected data to derive sufficient added-value to deploy their own services, applications, and systems on top of the IoMT. In addition, a network of moving things according to the present disclosure enables the use of sophisticated statistic-related methods to filter data, a very important factor when building machine learning algorithms.

Various aspects of the present disclosure may be seen in a method of managing data integrity in a network of moving things. The network may comprise a plurality of network nodes and a cloud-based system supporting services for the network. Such a method may comprise receiving data at a first network node of the plurality of network nodes, using a first data communication interface of the first network node; and identifying a subset of data validation techniques of a set of data validation techniques known to the first network node, using a collection of configuration parameters distributed to the first network node and a second network node of the plurality of network nodes. The method may also comprise determining, at the first network node, whether the data is valid, by applying to the data the data validation techniques in the identified subset; performing a first procedure to process the data, if the data received at the first network node is determined to be valid; and performing a second procedure, if the data received at the first network node is determined to be not valid.

In accordance with various aspects of the present disclosure, the plurality of network nodes may comprise a first subset of network nodes that are at fixed geographic locations and a second subset of network nodes that are mobile within a geographic region of service, and wherein each network node in the plurality of network nodes is configured to directly communicate wirelessly with network nodes in the first subset and the second subset. A network node that is mobile may be configured with interface circuitry for communicating with sensors of a vehicle transporting the network node, and the data validation techniques in the subset may be identified using a designated portion of the collection of configuration parameters that corresponds to the first network node. The first network node may determine whether the data is valid by applying the data validation techniques in the identified subset to the data using a configuration parameter from the collection that represents one or both of a delay tolerance and a periodicity of sending of the data, the first procedure may comprise forwarding the received data to the second network node, and the second procedure may comprise notifying the cloud-based system of the invalidity of the data. The first network node may determine whether the received data is valid by applying the data validation techniques in the identified subset to the received data according to characteristics of the data communication interface used to receive the data.

Further aspects of the present disclosure may be found in a non-transitory computer-readable medium having stored thereon a computer program. The computer program may have at least one code section comprising instructions executable by one or more processors for causing the one or more processors to perform steps of a method for managing data integrity in a network of moving things. The network may comprise a plurality of network nodes and a cloud-based system supporting services for the network, and the steps of the method may comprise the steps of the method described above.

Additional aspects of the present disclosure may be observed in a system for managing data integrity in a network of moving things. Such a system may comprise one or more processors configured to communicatively couple to a plurality of network nodes and a cloud-based system supporting services for the network. The one or more processors in such a system may be operable to, at least, perform the steps of the method described above.

Thus, an Internet of moving things in accordance with aspects of the present disclosure provides support for the application of updates (e.g., software, firmware, and/or data/configuration information) in a variety of device-types and hardware versions. Further, aspects of the present disclosure may be used to leverage an Internet of moving things to epidemically distribute updates at the lowest possible cost using low or zero cost communications technologies, and without the need to rely on cellular links. In accordance with various aspects of the present disclosure, a system may be configured to leverage the best available communication technology to download updates to various system components, and provides support for incremental updates as well as complete/full updates of parts of the operative system. In addition, a system in accordance with various aspects of the present disclosure provides support for geo-fenced updates and configurations.

An Internet of moving things in accordance with various aspects of the present disclosure may be used to connect different types of devices that are physically on the move and also statically deployed. Such devices may present different kinds hardware versions and expected behaviors. In order to support the evolution of products that have already been deployed, use of an update mechanism such as the one presented herein allows for new features to be installed in already deployed network units, providing higher levels of security, reliability, and functionality.

An Internet of moving things in accordance with various aspects of the present disclosure may provide a decentralized authentication mechanism for update validation, and may include a distributed update validation check. Further, such a system and network allows network units to download updates (e.g., software, firmware, and/or data/configuration information) for third-party and external network units. In addition, a system and network as described herein may support a distributed, cluster-based configuration management and decision mechanism for network units. Such a system may select the most plausible network configuration to use in any given situation. Aspects of an Internet of moving things in accordance with various aspects as described herein allow for updates to be downloaded and distributed epidemically in chunks.

As provided herein, a communication network and/or node thereof implemented in accordance with various aspects of this disclosure may increase the connectivity between nodes (e.g., between fixed and mobile APs), throughput may increase, range may increase, latency may decrease, packet loss may decrease, overall network performance may increase, etc. Additionally, data communication may be substantially more economical than with other types of networks (e.g., cellular, etc.). Further, a node (e.g., a fixed AP) implemented in accordance with various aspects of this disclosure may be installed at a location that does not have ready access to power and/or to a traditional type of backhaul. Still further, a network implemented in accordance with various aspects of this disclosure may be operated with fewer APs than would otherwise with necessary, reducing overall cost. Additionally, a network implemented in accordance with various aspects of this disclosure, for example having multiple adaptive fixed APs that are collocated, provides immense flexibility to provide differentiation of services, network redundancy, load balancing, high reliability, and dedicated services. In an example implementation, different APs at a same location or serving a same coverage area may utilize different respective channels, thus providing bandwidth allocation flexibility, for example to prioritize particular services or service classes, increasing overall spectrum utilization, etc. In general, increasing the coverage of high-range wireless (e.g., DSRC) technology, which may be utilized as the wireless backbone of the network of moving things, will enhance all that the technology has to offer.

In summary, various aspects of this disclosure provide systems and methods for enhancing node operation in a network of moving things. As non-limiting examples, various aspects of this disclosure provide systems and methods for adapting fixed access point coverage and/or power input/output in a network of moving things, adapting fixed access point backhaul communication, etc. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of managing data integrity in a network of moving things comprising a plurality of network nodes and a cloud-based system supporting services for the network, the method comprising:
   receiving data at a first network node of the plurality of network nodes, using a first data communication interface of the first network node;
   identifying a subset of data validation techniques of a set of data validation techniques known to the first network node;
   determining, at the first network node, whether the data is valid, based on the identified subset of the data validation techniques, wherein the determining comprises, at least:
      obtaining, via a global positioning component of the first network node, positioning information corresponding to a current location of the first network node at different instances of time; and
      assessing validity of the data based on the obtained positioning information, wherein:
      the assessing comprises determining timeliness of reception of the positioning information, and validating the positioning information based on sensory information obtained or generated in a vehicle comprising the first network node based on the data;
      the determining of the timeliness of the reception of the positioning information is configurable based on source of data; and
      the validating of the positioning information comprises determining that travel distance measured based on the positioning information is consistent with travel distance measured based on the sensory information obtained;
   performing a first procedure when the data received at the first network node is determined to be valid, wherein performing the first procedure comprises adjusting at least one function or component of the first network node or of the vehicle comprising the first network node based on the data; and
   performing a second procedure when the data received at the first network node is determined to be not valid.

2. The method according to claim 1, wherein the plurality of network nodes comprises a first subset of network nodes that are at fixed geographic locations and a second subset of network nodes that are mobile within a geographic region of service, and wherein each network node in the plurality of network nodes is configured to directly communicate wirelessly with network nodes in the first subset and the second subset.

3. The method according to claim 1, wherein a network node that is mobile is configured with interface circuitry for communicating with sensors of a vehicle transporting the network node.

4. The method according to claim 1, wherein the data validation techniques in the subset are identified using a designated portion of a collection of configuration parameters that corresponds to the first network node.

5. The method according to claim 1, further comprising determining whether the data is valid by applying the data validation techniques in the identified subset to the data using a configuration parameter from a collection that represents one or both of a delay tolerance and a periodicity of sending of the data.

6. The method according to claim 1, wherein the first procedure comprises forwarding the received data to a second network node.

7. The method according to claim 1, further comprising determining whether the received data is valid by applying the data validation techniques in the identified subset to the received data according to characteristics of the first data communication interface.

8. A non-transitory computer-readable medium having stored thereon a computer program having at least one code section comprising instructions executable by one or more processors for causing the one or more processors to perform steps of a method for managing data integrity in a network of moving things comprising a plurality of network nodes and a cloud-based system supporting services for the network, the steps of the method comprising:
   receiving data at a first network node of the plurality of network nodes, using a first data communication interface of the first network node;
   identifying a subset of data validation techniques of a set of data validation techniques known to the first network node;
   determining, at the first network node, whether the data is valid, based on the identified subset of the data validation techniques, wherein the determining comprises, at least:
      obtaining, via a global positioning component of the first network node, positioning information corresponding to a current location of the first network node at different instances of time; and
      assessing validity of the data based on the obtained positioning information, wherein:

the assessing comprises determining timeliness of reception of the positioning information, and validating the positioning information based on sensory information obtained or generated in a vehicle comprising the first network node based on the data;

the determining of the timeliness of the reception of the positioning information is configurable based on source of data; and the validating of the positioning information comprises determining that travel distance measured based on the positioning information is consistent with travel distance measured based on the sensory information obtained;

performing a first procedure when the data received at the first network node is determined to be valid, wherein performing the first procedure comprises adjusting at least one function or component of the first network node or of the vehicle comprising the first network node based on the data; and performing a second procedure when the data received at the first network node is determined to be not valid.

9. The non-transitory computer-readable medium according to claim 8, wherein the plurality of network nodes comprises a first subset of network nodes that are at fixed geographic locations and a second subset of network nodes that are mobile within a geographic region of service, and wherein each network node in the plurality of network nodes is configured to directly communicate wirelessly with network nodes in the first subset and the second subset.

10. The non-transitory computer-readable medium according to claim 8, wherein a network node that is mobile is configured with interface circuitry for communicating with sensors of a vehicle transporting the network node.

11. The non-transitory computer-readable medium according to claim 8, wherein the data validation techniques in the subset are identified using a designated portion of a collection of configuration parameters that corresponds to the first network node.

12. The non-transitory computer-readable medium according to claim 8, wherein the steps of the method further comprise determining whether the data is valid by applying the data validation techniques in the identified subset to the data using a configuration parameter from a collection that represent one or both of a delay tolerance and a periodicity of sending the data.

13. The non-transitory computer-readable medium according to claim 8, wherein the first procedure comprises forwarding the received data to a second network node.

14. The non-transitory computer-readable medium according to claim 8, wherein the steps of the method further comprise determining whether the received data is valid by applying the data validation techniques in the identified subset to the received data according to characteristics of the first data communication interface.

15. A system for managing data integrity in a network of moving things, the system comprising:
one or more processors configured to communicatively couple to a plurality of network nodes and a cloud-based system supporting services for the network, the one or more processors operable to, at least:
receive data at a first network node of the plurality of network nodes, using a first data communication interface of the first network node;
identify a subset of data validation techniques of a set of data validation techniques known to the first network node;
determine, at the first network node, whether the data is valid, based on the identified subset of the data validation techniques, wherein the determining comprises, at least:
obtaining, via a global positioning component of the first network node, positioning information corresponding to a current location of the first network node at different instances of time; and
assessing validity of the data based on the obtained positioning information, wherein:
the assessing comprises determining timeliness of reception of the positioning information, and validating the positioning information based on sensory information obtained or generated in a vehicle comprising the first network node based on the data;
the determining of the timeliness of the reception of the positioning information is configurable based on source of data; and
the validating of the positioning information comprises determining that travel distance measured based on the positioning information is consistent with travel distance measured based on the sensory information obtained;
perform a first procedure when the data received at the first network node is determined to be valid, wherein performing the first procedure comprises adjusting at least one function or component of the first network node or of the vehicle comprising the first network node based on the data; and
perform a second procedure when the data received at the first network node is determined to be not valid.

16. The system according to claim 15, wherein the plurality of network nodes comprises a first subset of network nodes that are at fixed geographic locations and a second subset of network nodes that are mobile within a geographic region of service, and wherein each network node in the plurality of network nodes is configured to directly communicate wirelessly with network nodes in the first subset and the second subset.

17. The system according to claim 15, wherein a network node that is mobile is configured with interface circuitry for communicating with sensors of a vehicle transporting the network node.

18. The system according to claim 15, wherein the data validation techniques in the subset are identified using a designated portion of a collection of configuration parameters that corresponds to the first network node.

19. The system according to claim 15, wherein the one or more processors are operable to determine whether the data is valid by applying the data validation techniques in the identified subset to the data using a configuration parameter from a collection that represent one or both of a delay tolerance and a periodicity of sending the data.

20. The system according to claim 15, wherein the first procedure comprises forwarding the received data to a second network node.

21. The system according to claim 15, wherein the one or more processors are operable to determine whether the received data is valid by applying the data validation techniques in the identified subset to the received data using characteristics of the first data communication interface.

22. The method according to claim 1, wherein:
the second procedure comprises notifying the cloud-based system of the invalidity of the data, and the notifying comprises providing information relating to one or more of: the data, a source of the data, the first network node, and the first data communication interface.

23. The non-transitory computer-readable medium according to claim 8, wherein:
the second procedure comprises notifying the cloud-based system of the invalidity of the data, and
the notifying comprises providing information relating to one or more of: the data, a source of the data, the first network node, and the first data communication interface.

24. The system according to claim 15, wherein:
the second procedure comprises notifying the cloud-based system of the invalidity of the data, and
the notifying comprises providing information relating to one or more of: the data, a source of the data, the first network node, and the first data communication interface.

25. The method according to claim 1, wherein the first network node is mobile, and wherein determining whether the data is valid comprises:
assessing movement of the first network node based on the data;
assessing movement of the first network node based on information obtained from another source; and
determining validity of the data based on comparison between assessed movement of the first network node based on the data and assessed movement of the first network node based on the information obtained from another source.

26. The non-transitory computer-readable medium according to claim 8, wherein the first network node is mobile, and wherein determining whether the data is valid comprises:
assessing movement of the first network node based on the data;
assessing movement of the first network node based on information obtained from another source; and
determining validity of the data based on comparison between assessed movement of the first network node based on the data and assessed movement of the first network node based on the information obtained from another source.

27. The system according to claim 15, wherein the first network node is mobile, and wherein the one or more processors are operable to, when determining whether the data is valid:
assess movement of the first network node based on the data;
assess movement of the first network node based on information obtained from another source; and
determine validity of the data based on comparison between assessed movement of the first network node based on the data and assessed movement of the first network node based on the information obtained from another source.

28. The method according to claim 1, wherein determining whether the data is valid comprises:
when the data validation techniques are based on expected reliability, determining a time interval after a last transfer of data exceeds a preset duration;
when the data validation techniques are based on improved communication reliability, assessing a sequence number for each message;
when the data validation techniques are based on partial integrity, determining the data is received from a data source that provides incomplete information;
when the data validation techniques are based on data source diversity, detecting data inconsistencies based on determining of a preset metric using at least different data sources;
when the data validation techniques are based on data source reliability, determining if a data source provided erroneous information.

29. The non-transitory computer-readable medium according to claim 8, wherein determining whether the data is valid comprises:
when the data validation techniques are based on expected reliability, determining a time interval after a last transfer of data exceeds a preset duration;
when the data validation techniques are based on improved communication reliability, assessing a sequence number for each message;
when the data validation techniques are based on comprise use of partial integrity, determining the data is received from a data source that provides incomplete information;
when the data validation techniques are based on data source diversity, detecting data inconsistencies based on determining of a preset metric using at least different data sources;
when the data validation techniques are based on data source reliability, determining if a data source provided erroneous information.

30. The system according to claim 15, wherein the one or more processors configured to, when determining at the first network node whether the data is valid based on the data validation techniques:
when the data validation techniques are based on expected reliability, determine a time interval after a last transfer of data exceeds a preset duration;
when the data validation techniques are based on improved communication reliability, assess a sequence number for each message;
when the data validation techniques are based on partial integrity, determine the data is received from a data source that provides incomplete information;
when the data validation techniques are based on data source diversity, detect data inconsistencies based on determining of a preset metric using at least different data sources; and
when the data validation techniques are based on data source reliability, determine if a data source provided erroneous information.

* * * * *